United States Patent
Zhang et al.

(10) Patent No.: US 12,474,298 B2
(45) Date of Patent: Nov. 18, 2025

(54) ISOELECTRIC FOCUSING SAMPLE MATRIX

(71) Applicant: Bristol-Myers Squibb Company, Princeton, NJ (US)

(72) Inventors: Xin Zhang, Newton, MA (US); Letha Chemmalil, Devens, MA (US); Julia Ding, Weston, MA (US); Zhengjian Li, Sudbury, MA (US)

(73) Assignee: BRISTOL-MYERS SQUIBB COMPANY, Princeton, NJ (US)

( * ) Notice: Subject to any disclaimer, the term of this patent is extended or adjusted under 35 U.S.C. 154(b) by 496 days.

(21) Appl. No.: 17/759,616

(22) PCT Filed: Jan. 27, 2021

(86) PCT No.: PCT/US2021/015291
§ 371 (c)(1),
(2) Date: Jul. 27, 2022

(87) PCT Pub. No.: WO2021/154854
PCT Pub. Date: Aug. 5, 2021

(65) Prior Publication Data
US 2023/0076713 A1    Mar. 9, 2023

Related U.S. Application Data

(60) Provisional application No. 62/966,359, filed on Jan. 27, 2020.

(51) Int. Cl.
*G01N 27/447* (2006.01)

(52) U.S. Cl.
CPC ............ *G01N 27/44747* (2013.01); *G01N 27/44795* (2013.01)

(58) Field of Classification Search
CPC ....... G01N 27/44747; G01N 27/44795; C11D 3/38636
See application file for complete search history.

(56) References Cited

U.S. PATENT DOCUMENTS

| | | | |
|---|---|---|---|
| 4,139,440 | A | 2/1979 | Chrambach et al. |
| 5,660,701 | A | 8/1997 | Grushka et al. |

(Continued)

FOREIGN PATENT DOCUMENTS

| | | | |
|---|---|---|---|
| CN | 1185836 A | 6/1998 | |
| CN | 1549924 A | 11/2004 | |

(Continued)

OTHER PUBLICATIONS

Bean et al., "Separation of Water-Soluble Proteins from Cereals by High-Performance Capillary Electrophoresis (HPCE)," 2003, Cereal Chemistry, vol. 80, pp. 505-510 (Year: 2003).*

(Continued)

*Primary Examiner* — Luan V Van
*Assistant Examiner* — Kaylee Tseng
(74) *Attorney, Agent, or Firm* — Sterne, Kessler, Goldstein & Fox P.L.L.C.

(57) ABSTRACT

The present disclosure provides icIEF sample matrices that enable icIEF analysis of PEGylated proteins in their real conjugated states. The sample matrices of the present disclosure can include glycine, which enables the separation of co-migrated PEGylated protein charge variants. The sample matrices can also include taurine, which further improves icIEF assay by depleting matrix induced baseline interferences. Accordingly, a sample matrix of the present disclosure including a combination of glycine and taurine enables icIEF separation of acidic and basic species from the main peak for PEGylated proteins, allowing the identification/separation, characterization and quantification of discrete (Continued)

Figure 1:
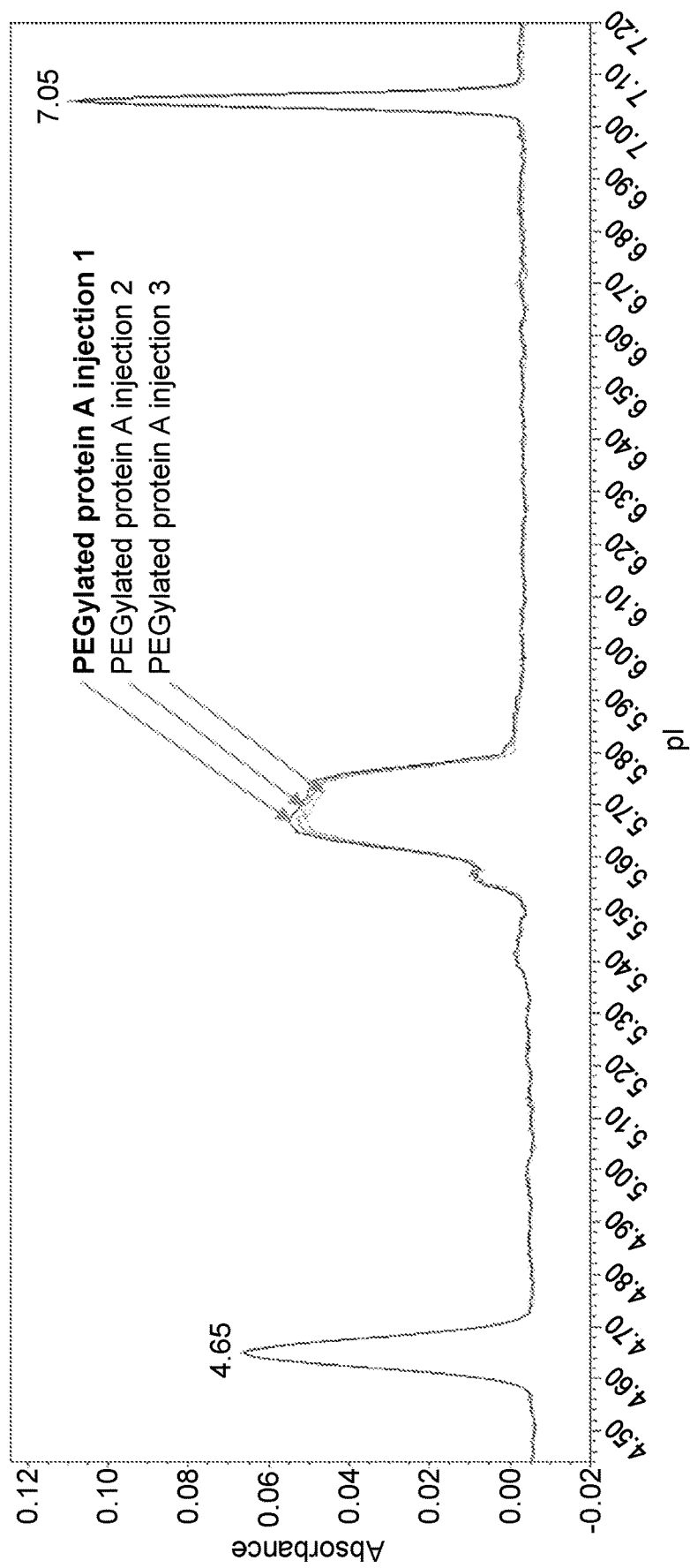

PEGylated protein species. By using the sample matrices of the present disclosure to characterize PEGylated proteins by icIEF, repeatability, linearity, accuracy, sample stability, and method robustness are achieved.

9 Claims, 9 Drawing Sheets

(56) References Cited

U.S. PATENT DOCUMENTS

| | | | | |
|---|---|---|---|---|
| 5,824,478 | A | * | 10/1998 | Muller ................... G01N 33/58 435/7.1 |
| 7,297,244 | B2 | | 11/2007 | Nouadje et al. |
| 7,914,656 | B2 | | 3/2011 | Bukshpan et al. |
| 8,945,360 | B2 | | 2/2015 | Petersen et al. |
| 10,983,090 | B2 | | 4/2021 | Thacker et al. |
| 2004/0154921 | A1 | | 8/2004 | Te Kaat |
| 2019/0343918 | A1 | | 11/2019 | Graham et al. |

FOREIGN PATENT DOCUMENTS

| | | |
|---|---|---|
| CN | 101799448 A | 8/2010 |
| CN | 102292633 A | 12/2011 |
| CN | 108351324 A | 7/2018 |
| EP | 0870834 A1 | 10/1998 |
| JP | 2009074811 A | 4/2009 |
| JP | 2013533490 A | 8/2013 |
| WO | WO-9640731 A1 | 12/1996 |
| WO | WO-2005114220 A2 | 12/2005 |
| WO | WO-2017093326 A1 | 6/2017 |
| WO | WO-2019183290 A1 | 9/2019 |
| WO | WO-2020097139 A1 | 5/2020 |
| WO | WO-2021154854 A1 | 8/2021 |

OTHER PUBLICATIONS

Demirdirek et al., "Comparison of imaged capillary isoelectric focusing and cation exchange chromatography for monitoring dextrose-mediated glycation of monoclonal antibodies in infusion solutions," 2019, Journal of Chromatography B, vol. 1105, pp. 156-163 (Year: 2019).*

Arentoft et al., "High-performance capillary electrophoresis for the determination of trypsin and chymotrypsin inhibitors and their association with trypsin, chymotrypsin and monoclonal antibodies," 1993, Journal of Chromatography, vol. 652, pp. 189-198 (Year: 1993).*

Bean et al., "Acetonitrile as a Buffer Additive for Free Zone Capillary Electrophoresis Separation and Characterization of Maize (*Zeamays* L.) and Sorghum (*Sorghum bicolor* L. Moench) Storage Proteins," 2000, Journal of Agricultural and Food Chemistry, vol. 48, pp. 318-327 (Year: 2000).*

Zhang et al., "Imaged capillary isoelectric focusing in native condition: A novel and successful example," 2017, Analytical Biochemistry, vol. 537, pp. 13-19 (Year: 2017).*

Zhu et al., "On-line amino acid-based capillary isoelectric focusing-ESI-MS/MS for protein digests analysis," 2012, Analytica Chimica Acta, vol. 750, p. 207-211 (Year: 2012).*

Shimura, "Chapter 7 Capillary Isoelectric Focusing," 2018, Capillary Electromigration Separation Methods, pp. 167-187 (Year: 2018).*

Arakawa, T., et al., "Biotechnology Applications of Amino Acids in Protein Purification and Formulations," Amino Acids 33(4):587-605, Springer-Verlag, Austria (Nov. 2007).

Basle, E., et al., "Protein Chemical Modification on Endogenous Amino Acids," Chemistry & Biology 17(3):213-27, Elsevier, Netherlands (Mar. 2010).

Brosnan, J.T and Brosnan, M.E "The sulfur-containing Amino Acids: an Overview," The Journal of Nutrition 136(6 Suppl):1636S-1640S, Elsevier, Netherlands (Jun. 2006).

Bushey, M.M and Jorgenson, J.W., "Capillary Electrophoresis of Proteins in Buffers Containing High Concentrations of Zwitterionic Salts," Journal of Chromatography 480:301-310, Elsevier, Netherlands (Oct. 1989).

Cousteils, K., et al., "High-Throughput Precision with On-Board Mixing for Imaged Capillary Isoelectric Focusing (iCIEF)," Chromatography, 4 pages, (Feb. 2019).

Derringer, G and Suich, R., "Simultaneous Optimization of Several Response Variables," Journal of Quality Technology 12(4):214-219, Taylor & Francis, United Kingdom (1980).

Gong, B.Y and Ho, J.W., et al., "Effect of Zwitterionic Surfactants on the Separation of Proteins by Capillary Electrophoresis," Electrophoresis 18(5):732-735, Wiley-VCH, Germany (May 1997).

Harris, J.M and Chess, R.B., "Effect of Pegylation on Pharmaceuticals," Nature Reviews Drug Discovery 2(3):214-221, Nature Pub Group, United Kingdom (Mar. 2003).

Holm, L.S., et al., "Preferential Interactions and the Effect of Protein PEGylation," PLoS One 10(7):e0133584, Public Library of Science, United States (Jul. 2015).

ICH Harmonised Tripartite Guideline Q2 (R1), Validation of Analytical Procedures: Text and Methodology, 17 pages, (Nov. 2005).

International Search Report and Written Opinion for International Application No. PCT/US2021/015291, European Patent Office, Netherlands, mailed on May 11, 2021, 10 pages.

Jevsevar, S., et al., "PEGylation of Therapeutic Proteins," Biotechnology Journal 5(1):113-128, Wiley-VCH Verlag, Germany (Jan. 2010).

Zhang, X., et al., "A Novel Reagent Significantly Improved Assay Robustness in Imaged Capillary Isoelectric Focusing," Analytical Biochemistry 15:521:1-7, Elsevier, United States (Mar. 2017).

Kilar, F., "Isoelectric Focusing in Capillaries," CRC Handbook on Capillary Electrophoresis: A Practical Approach, 4:95-109, CRC Press, Inc, United States (1994).

Li, N., et al., "Evaluation of the iCE280 Analyzer as a Potential High-throughput Tool for Formulation Development," Journal of Pharmaceutical and Biomedical Analysis 43(3):963-972, Elsevier Science, United Kingdom (Feb. 2007).

Liu, C.C and Schultz, P.G., "Adding New Chemistries to the Genetic Code," Annual Review of Biochemistry 79:413-444, Annual Reviews, United States (2010).

Molek, J.R and Zydney, A.L., "Capillary Electrophoresis of PEGylated Proteins," AIChE100—AIChE Annual Meeting, Conference Proceedings, 8 pages, (2008).

Molineux, G., "Pegylation: Engineering Improved Pharmaceuticals for Enhanced Therapy," Cancer Treatment Reviews 28 Suppl A:13-16, Elsevier, Netherlands (Apr. 2002).

Muir, T.W., "Semisynthesis of Proteins by Expressed Protein Ligation," Annual Review of Biochemistry 72:249-289, Annual Reviews, United States (2003).

Nowak, P.M., et al., "Capillary Coating as an Important Factor in Optimization of the Off-line and on-line MEKC Assays of the Highly Hydrophobic Enzyme Chlorophyllase," Analytical and Bioanalytical Chemistry 409(6):1493-1501, Springer-Verlag, Germany (Feb. 2017).

Nucci, M.L., et al., "The Therapeutic Value of Poly(Ethylene Glycol)-modified Proteins," Advanced Drug Delivery Reviews 6(2):133-151, Elsevier, Netherlands (Mar. 1991).

O'Hare, H.M., et al., "Chemical Probes Shed Light on Protein Function," Current Opinion in Structural Biology 17(4):488-494, Elsevier Science, United Kingdom (Aug. 2007).

Oudshoorn, M.H.M., et al., "Synthesis and Characterization of Hyperbranched Polyglycerol Hydrogels," Biomaterials 27(32):5471-5479, Elsevier Science, Netherlands (Nov. 2006).

Righetti, P.G., "Carrier Ampholytes for IEF, on Their Fortieth Anniversary (1967-2007), Brought to Trial in Court: the Verdict," Electrophoresis 28(21):3799-3810, Wiley-VCH, Germany (Nov. 2007).

Salas-Solano, O., et al., "Robustness of iCIEF Methodology for the Analysis of Monoclonal Antibodies: an Interlaboratory Study," Journal of Separation Science 35(22):3124-3129, Wiley-VCH, Germany (Nov. 2012).

Shrivastava, A. and Gupta, V., "Methods for the Determination of Limit of Detection and Limit of Quantitation of the Analytical

(56) References Cited

OTHER PUBLICATIONS

Methods," Chronicles of Young Scientists 2(1):21-25, Organization of Pharmaceutical Unity with BioAllied Sciences, India (2011).

Sosic, Z., et al., "Application of Imaging Capillary IEF for Characterization and Quantitative Analysis of Recombinant Protein Charge Heterogeneity," Electrophoresis 29(21):4368-4376, Wiley-VCH, Germany (Nov. 2008).

Veronese, F.M and Mero, A., "The Impact of Pegylation on Biological Therapies," BioDrugs 22(5):315-329, Springer International, New Zealand (2008).

Veronese, F.M and Pasut, G., "PEGylation, Successful Approach to Drug Delivery," Drug Discovery Today 10(21):1451-1458, Elsevier Science, United Kingdom (Nov. 2005).

Wilms, D., et al., "Hyperbranched Polyglycerols: From the Controlled Synthesis of Biocompatible Polyether Polyols to Multipurpose Applications," Accounts of Chemical Research 43(1):129-141, American Chemical Society, United States (Jan. 2010).

Zhang, X., et al., "A novel approach enables imaged capillary isoelectric focusing analysis of PEGylated proteins," Electrophoresis 41(9):735-742, Wiley, United States (May 2020).

Liu, X., et al., "Capillary Isoelectric Focusing of Protein," Chinese Journal of Chromatography 15(1):8-11, China Academic Journal Electronic Publishing House, China (Jan. 1997).

Wu, Y., ed., *New Experiments in Biochemistry*, p. 49, People's Health Publishing House, Beijing, China (2002).

Zhang, X., et al., "A novel approach enables imaged capillary isoelectric focusing analysis of PEGylated proteins," Electrophoresis 41(9):735-742, Wiley, United States (Jan. 2020).

\* cited by examiner

ISOELECTRIC FOCUSING SAMPLE MATRIX

FIELD

The present disclosure provides compositions and method to increase the resolution of imaged capillary isoelectric focusing analysis of PEGylated proteins and peptides.

BACKGROUND

PEGylation is a process through which polyethylene glycol (PEG) chains are conjugated to proteins or other molecules (Veronese & Mero (2008) BioDrugs 22:315-329). PEGylation has been used as a strategy to enhance pharmacokinetic properties of therapeutic proteins (Holm et al. (2015) PloS One 10(7): e0133584; Jevsevar et al. (2010) Biotechnol. J. 5:113-128; Harris & Chess (2003) Nat. Rev. Drug Discov. 2:214-221) as well as reduce immunogenicity and toxicity (Nucci et al. (1991) Advanced Drug Delivery Reviews 6:133-151; Veronese & Pasut (2005) Drug Discov. Today 10:1451-1458), which are appealing attributes for therapeutically relevant proteins.

PEG-protein conjugations can be formed by chemical or enzymatic reactions (Basle et al. (2010) Chemistry & Biology 17:213-227; O'Hare et al. (2007) Current Opinion in Structural Biology 17:488-494), and by semi-synthetic methods such as expressed protein ligation (Muir (2003) Annual Review of Biochemistry 72:249-289). Alternatively, unnatural amino acids have been incorporated into recombinant proteins as chemical handles for conjugation of polyethylene glycol (Liu & Schultz (2010) Annual Review of Biochemistry 79:413-444).

Imaged capillary isoelectric focusing (icIEF) is the current industry standard for determining the isoelectric point (pI) of proteins as well as relative quantification of charge species (Sosic et al. (2008) Electrophoresis 29:4368-4376; Cousteils et al. (2019) Chromatography Today, February 26). However, the icIEF separation of PEGylated proteins is difficult. Relatively broad and distorted peak shapes are observed for icIEF separation of PEGylated proteins. Charge variants of PEGylated proteins merge into one broad peak during isoelectric focusing, most likely due to masking of the protein by the surrounded polyethylene glycol chain as well as the increased hydrodynamic volume (Molineux (2002) Cancer Treat Rev. 28:13-16). Modification of, e.g., carrier ampholyte contents, methylcellulose concentration, protein concentration, focusing time, and addition of other additives could not yield reasonable peak shapes (Li et al. (2007) Journal of Pharmaceutical and Biomedical Analysis 43:963-972).

Accordingly, there is a need for new icIEF methods that allow the discrimination of charge variants of PEGylated proteins.

BRIEF SUMMARY

The present disclosure provides an imaged capillary isoelectric focusing (icIEF) sample matrix comprising glycine and/or taurine. In some aspects, glycine is at a concentration between about 1 mM and about 200 mM.

In some aspects of the icIEF sample matrix, glycine is at a concentration between about 1 mM and about 150 mM, about 1 mM and about 100 mM, about 1 mM and about 90 mM, about 1 mM and about 80 mM, about 1 mM and about 70 mM, about 1 mM and about 60 mM, about 1 mM and about 50 mM, about 1 mM and about 40 mM, about 10 mM and about 200 mM, about 10 mM and about 150 mM, about 10 mM and about 100 mM, about 10 mM and about 90 mM, about 10 mM and about 80 mM, about 10 mM and about 70 mM, about 10 mM and about 60 mM, about 10 mM and about 50 mM, about 10 mM and about 40 mM, about 20 mM and about 200 mM, about 20 mM and about 150 mM, about 20 mM and about 100 mM, about 20 mM and about 90 mM, about 20 mM and about 80 mM, about 20 mM and about 70 mM, about 20 mM and about 60 mM, about 20 mM and about 50 mM, about 20 mM and about 40 mM, about 30 mM and about 200 mM, about 30 mM and about 150 mM, about 30 mM and about 100 mM, about 30 mM and about 90 mM, about 30 mM and about 80 mM, about 30 mM and about 70 mM, about 30 mM and about 60 mM, about 30 mM and about 50 mM, about 30 mM and about 40 mM, about 40 mM and about 200 mM, about 40 mM and about 150 mM, about 40 mM and about 100 mM, about 40 mM and about 90 mM, about 40 mM and about 80 mM, about 40 mM and about 70 mM, about 40 mM and about 60 mM, or about 40 mM and about 50 mM.

In some aspects of the icIEF sample matrix, glycine is at a concentration of about 10 mM, about 20 mM, about 30 mM, about 40 mM, about 50 mM, about 60 mM, about 70 mM, about 80 mM, about 90 mM, about 100 mM, about 110 mM, or about 120 mM. In some aspects, glycine is at a concentration between about 30 mM and about 50 mM. In some aspects, glycine is at a concentration between about 36 mM and about 44 mM. In some aspects, glycine is at a concentration of about 40 mM.

In some aspects of the icIEF sample matrix, taurine is at a concentration between 1 mM and 200 mM. In some aspects, taurine is at a concentration between about 1 mM and about 150 mM, about 1 mM and about 100 mM, about 1 mM and about 90 mM, about 1 mM and about 80 mM, about 1 mM and about 70 mM, about 1 mM and about 60 mM, about 1 mM and about 50 mM, about 1 mM and about 40 mM, about 10 mM and about 200 mM, about 10 mM and about 150 mM, about 10 mM and about 100 mM, about 10 mM and about 90 mM, about 10 mM and about 80 mM, about 10 mM and about 70 mM, about 10 mM and about 60 mM, about 10 mM and about 50 mM, about 10 mM and about 40 mM, about 20 mM and about 200 mM, about 20 mM and about 150 mM, about 20 mM and about 100 mM, about 20 mM and about 90 mM, about 20 mM and about 80 mM, about 20 mM and about 70 mM, about 20 mM and about 60 mM, about 20 mM and about 50 mM, about 20 mM and about 40 mM, about 30 mM and about 200 mM, about 30 mM and about 150 mM, about 30 mM and about 100 mM, about 30 mM and about 90 mM, about 30 mM and about 80 mM, about 30 mM and about 70 mM, about 30 mM and about 60 mM, about 30 mM and about 50 mM, about 30 mM and about 40 mM, about 40 mM and about 200 mM, about 40 mM and about 150 mM, about 40 mM and about 100 mM, about 40 mM and about 90 mM, about 40 mM and about 80 mM, about 40 mM and about 70 mM, about 40 mM and about 60 mM, or about 40 mM and about 50 mM.

In some aspects of the icIEF sample matrix, taurine is at a concentration of about 10 mM, about 20 mM, about 30 mM, about 40 mM, about 50 mM, about 60 mM, about 70 mM, about 80 mM, about 90 mM, about 100 mM, about 110 mM, or about 120 mM. In some aspects, taurine is at a concentration between about 40 mM and about 60 mM. In some aspects, taurine is at a concentration between about 45 mM and about 55 mM. In some aspects, taurine is at a concentration of about 50 mM.

In some aspects, the icIEF sample matrix further comprises a carrier ampholyte. In some aspects, the carrier ampholyte is PHARMALYTE®. In some aspects, the PHARMALYTE® is PHARMALYTE® 3-10. In some aspects, the carrier ampholyte is at a concentration of about 2% to about 6% (v:v). In some aspects, the carrier ampholytes is at a concentration of about 3.6% to about 4.4%. In some aspects, the carrier ampholyte is at a concentration of about 4% (v:v).

In some aspects, the icIEF sample matrix further comprises methyl cellulose. In some aspects, methyl cellulose is at a concentration of about 0.35% (w:v). In some aspects, the icIEF sample matrix comprises about 40 mM of glycine and about 50 mM taurine. In some aspects, the icIEF sample matrix comprises about 4% (v:v) PHARMALYTE® 3-10, about 0.35% (w:v) methyl cellulose, about 40 mM of glycine and about 50 mM taurine.

The present disclosure also provides a method of reducing matrix induced baseline interference comprising using an icIEF sample matrix disclosed herein during icIEF. In some aspects, the interference is basic region interference. In some aspects, the baseline interference is reduced compared to the baseline interference observed when using a reference sample matrix without taurine. In some aspects, the reference sample matrix without taurine is a urea containing matrix.

The present disclosure also provides a method of measuring the isoelectric point (pI) of a PEGylated protein comprising subjecting a sample comprising an icIEF sample matrix disclosed herein and the PEGylated protein to icIEF. The present disclosure also provides a method of enhancing separation of co-migrating peaks of a PEGylated protein in icIEF comprising subjecting a sample comprising an icIEF sample matrix disclosed herein and the PEGylated protein to icIEF. In some aspects, the PEGylated protein is at a concentration between about 0.25 mg/mL and about 0.75 mg/mL. In some aspects, the PEGylated protein is at a concentration of about 0.5 mg/mL.

In some aspects of the methods disclosed herein, the icIEF comprises (i) applying a first voltage for a first predetermined period of time such that the carrier ampholyte forms a pH gradient within the capillary; and (ii) applying a second voltage for a second predetermined period of time to focus the migration of charge variants of the protein within the capillary such that the overall charge of the variants is neutral. In some aspects, the first voltage is about 1500V and the first predetermined period of time is about 1 min. In some aspects, the second voltage is about 3000 V and the second predetermined period of time is about 8 minutes.

The present disclosure also provides a method of determining the stability of PEGylated proteins comprising using an icIEF sample matrix disclosed herein. In some aspects, the stability is thermal stability. In some aspects, the thermal stability is determined following incubation of the PEGylated protein at 37° C., 38° C., 39° C., 40° C., 41° C., 42° C., 43° C., 44° C., 45° C., 46° C., 47° C., 48° C., 49° C., or 50° C. In some aspects, the PEGylated protein is incubated for 1, 2, 3, 4, 5, 6, 7, 8, 9, 10, 11, 12, 13, 14, or 15 days. In some aspects, determining the stability is quantitative.

BRIEF DESCRIPTION OF THE DRAWINGS/FIGURES

FIG. 1 shows electropherograms of PEGylated Protein A with 2 M urea. A 30 kDa single linear methoxy polyethylene glycol chain was conjugated to Protein A via an unnatural amino acid. The sample matrix contains 4% (v:v) PHARMALYTE® 3-10, 0.35% (w:v) methyl cellulose and 2 M urea. PEGylated Protein A was diluted in deionized water to 2.5 mg/mL and then further diluted in sample matrix to 0.25 mg/mL. Samples focused at 1500 V for 1 minute and then at 3000 V for 8 minutes.

Figure 2:
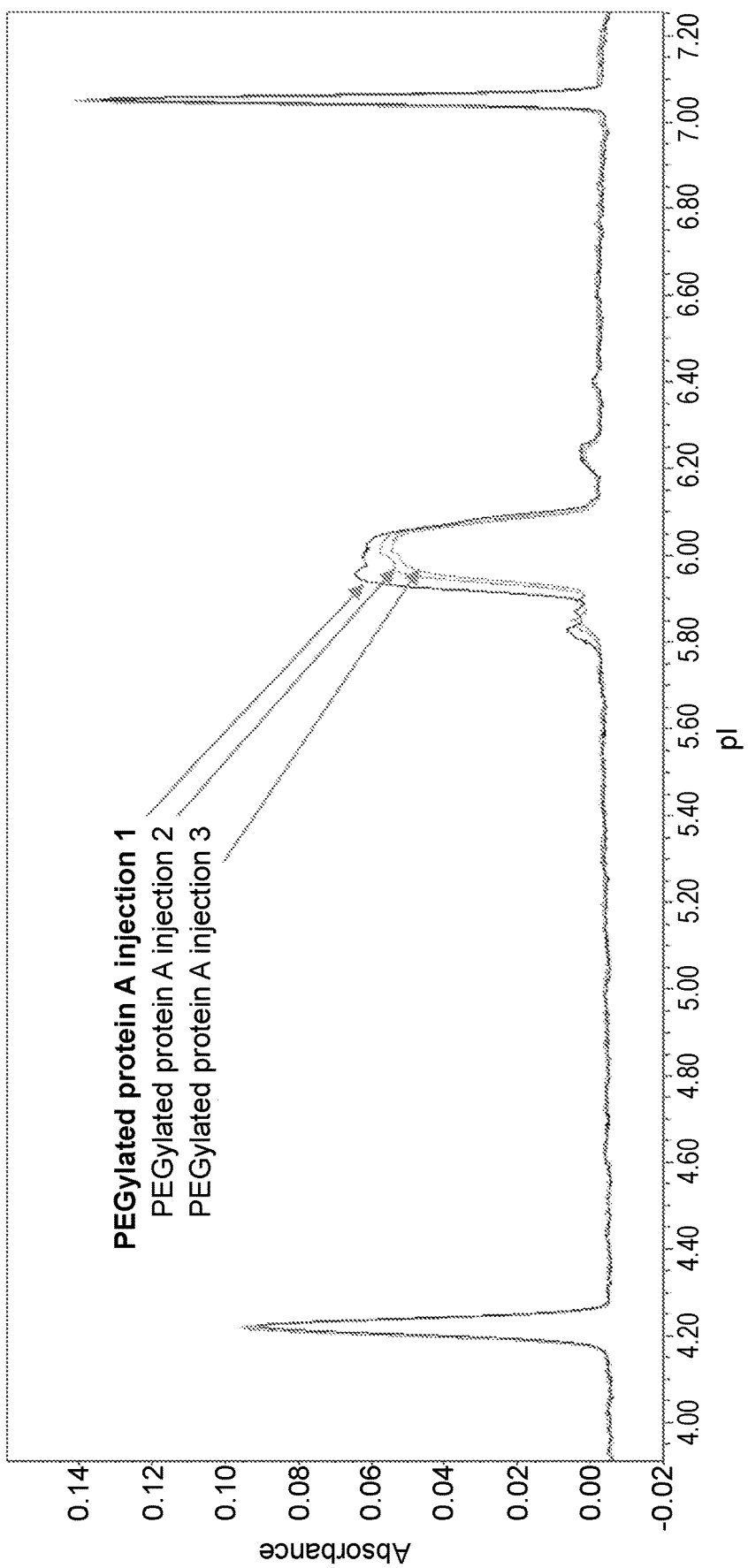

FIG. 2 shows an electropherogram overlay of PEGylated Protein A in a mixture of PHARMALYTE® 4-6.5 and PHARMALYTE® 5-8. The sample matrix contained 2% (v:v) PHARMALYTE® 4-6.5 and 2% (v:v) PHARMALYTE® 5-8, and 0.35% (w:v) methyl cellulose. PEGylated Protein A was diluted in deionized water to 2.5 mg/mL and then further diluted in sample matrix to 0.25 mg/mL. Samples focused at 1500 V for 1 minute and then at 3000 V for 8 minutes.

Figure 3:
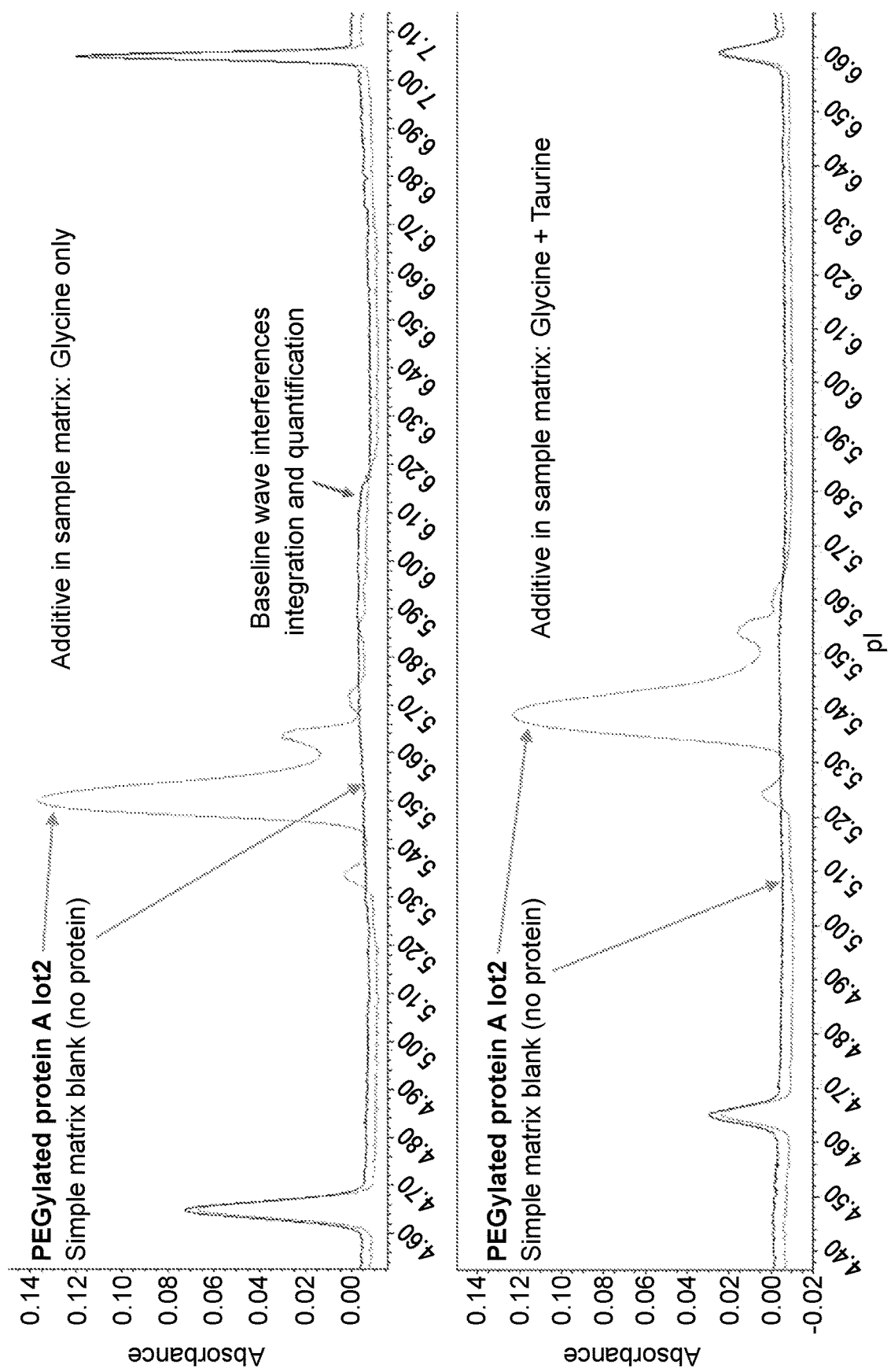

FIG. 3 shows an electropherogram overlay of PEGylated Protein A with comparing a sample matrix with glycine as the sole additive versus a sample matrix comprising both glycine and taurine as additives. The sample matrix contained 4% (v:v) PHARMALYTE® 3-10, 0.35% (w:v) methyl cellulose and 40 mM glycine (or 40 mM glycine and 50 mM taurine). PEGylated Protein A was diluted in deionized water to 5 mg/mL and then further diluted in sample matrix to 0.5 mg/mL. Samples focused at 1500 V for 1 minute and then at 3000 V for 8 minutes.

Figure 4:
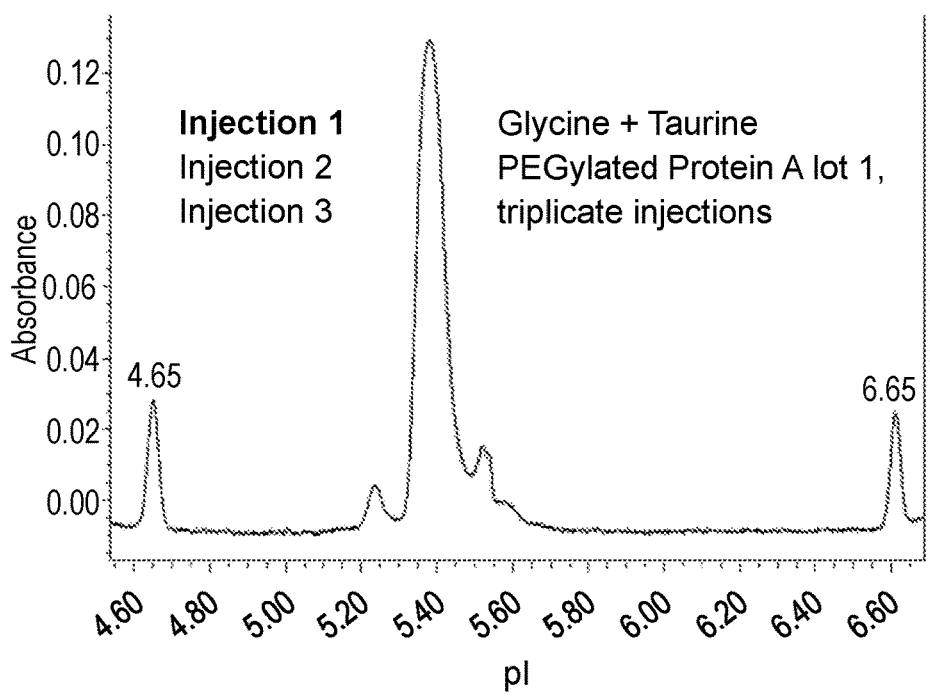
Figure 4:
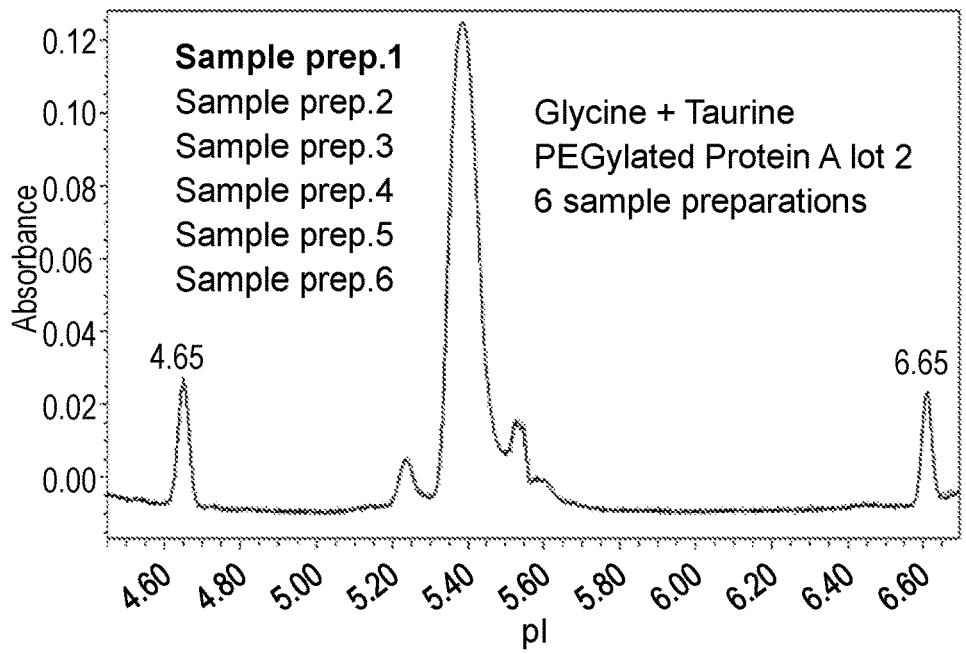

FIG. 4 shows an electropherogram of PEGylated Protein A in a sample matrix comprising glycine and taurine as additives. The sample matrix contained 4% (v:v) PHARMALYTE® 3-10, 0.35% (w:v) methyl cellulose, 40 mM of glycine and 50 mM taurine. PEGylated protein A was diluted in deionized water to 5 mg/mL and then further diluted in sample matrix to 0.5 mg/mL. Samples focused at 1500 V for 1 minute and then at 3000 V for 8 minutes.

Figure 5:
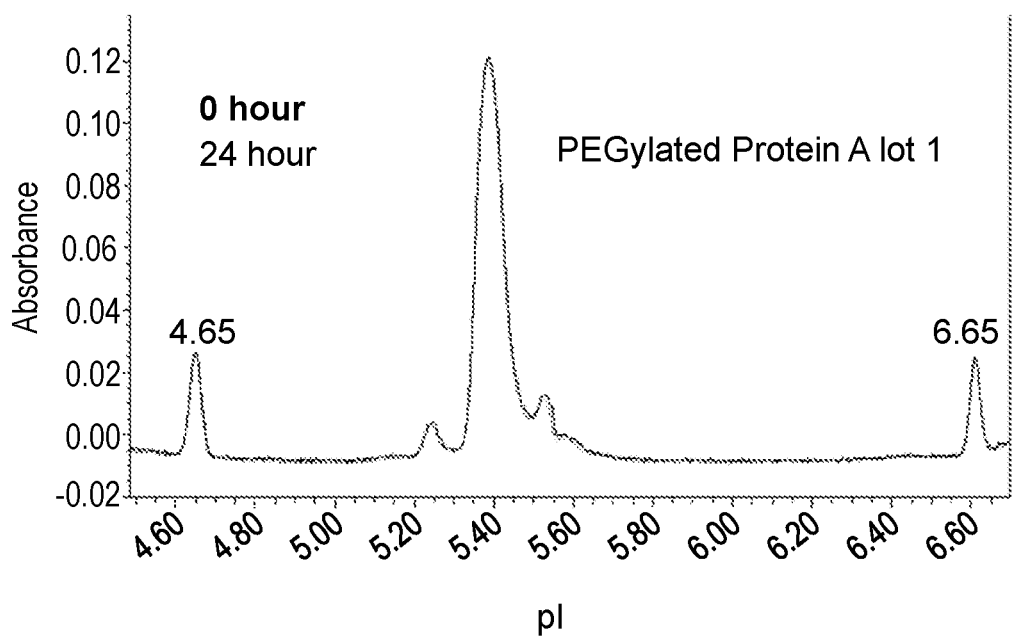
Figure 5:
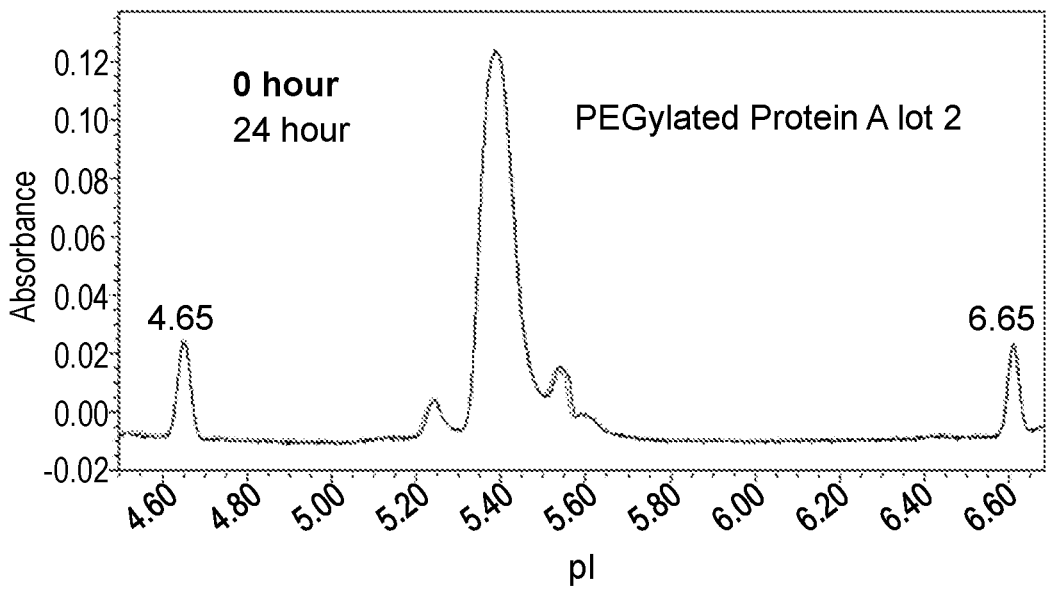

FIG. 5 shows an electropherogram of PEGylated Protein A in a sample matrix comprising glycine and taurine at 0 hour and 24 hours in auto-sampler set to 10° C. The sample matrix contained 4% (v:v) PHARMALYTE® 3-10, 0.35% (w:v) methyl cellulose, 40 mM of glycine and 50 mM taurine. PEGylated Protein A was diluted in deionized water to 5 mg/mL and then further diluted in sample matrix to 0.5 mg/mL. Samples focused at 1500 V for 1 minute and then at 3000 V for 8 minutes.

Figure 6:
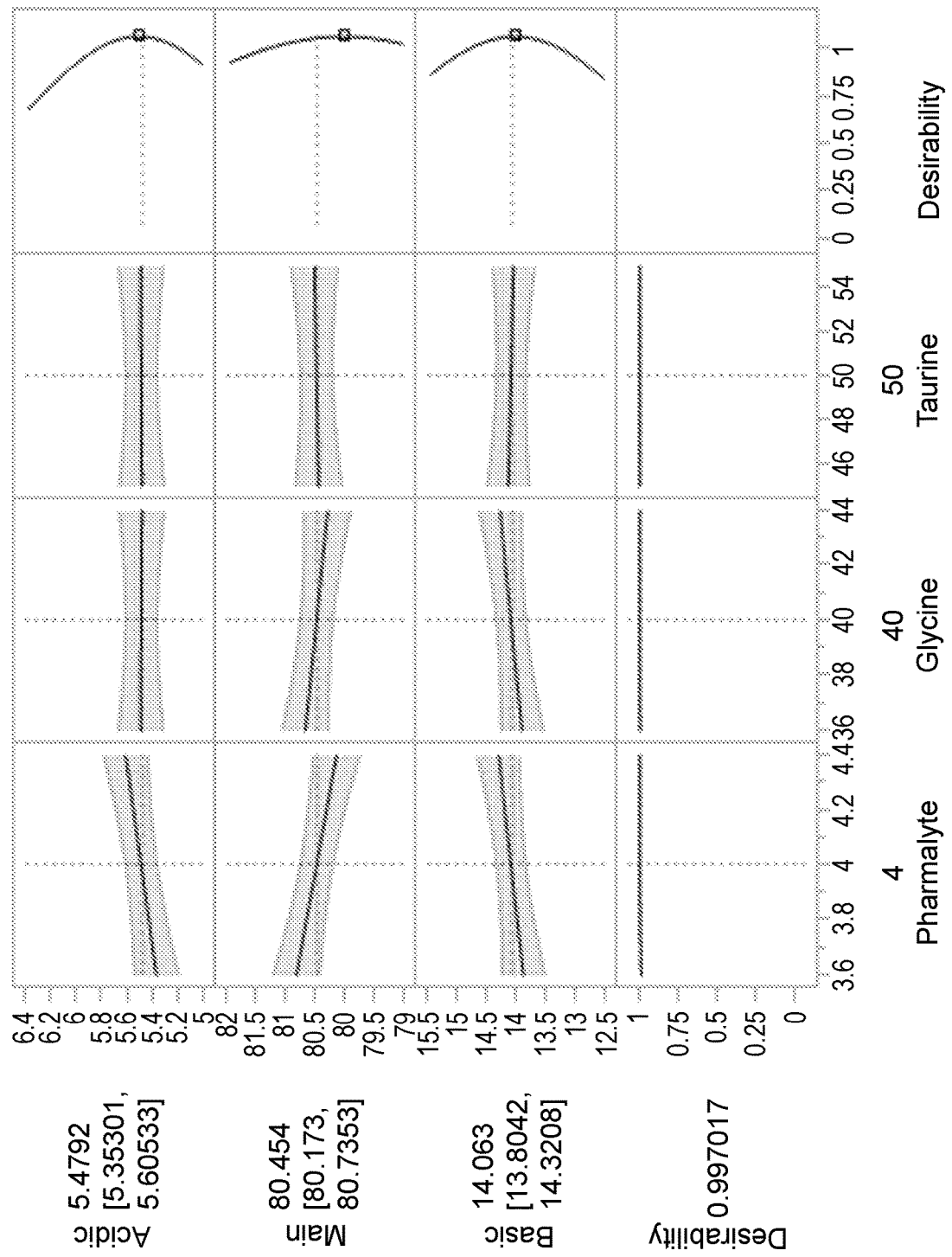

FIG. 6 shows a JMP desirability profiling plot. The concentrations of PHARMALYTE®, glycine, and taurine listed in TABLE 4 are X variables and the resulting percentage peak area for acidic, main, and basic group are Y responds.

Figure 7:
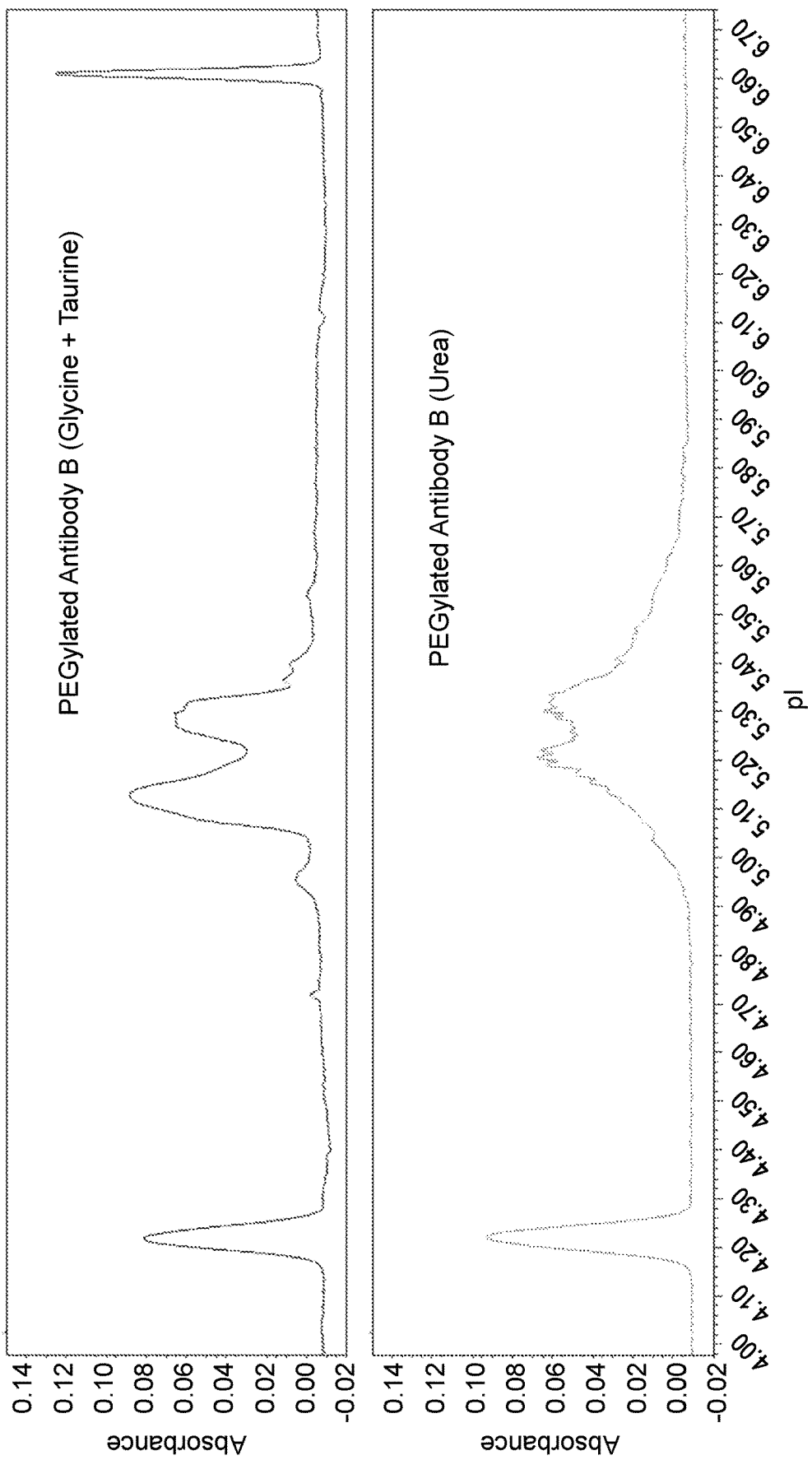

FIG. 7 shows an electropherogram of PEGylated Antibody B in a sample matrix comprising glycine and taurine as additives, compared to a sample matrix comprising urea as additive. The sample matrix contained 4% (v:v) PHARMALYTE® 3-10, 0.35% (w:v) methyl cellulose, 40 mM of glycine and 50 mM taurine (or 2M urea). PEGylated Antibody B was diluted in deionized water to 2.5 mg/mL and then further diluted in sample matrix to 0.25 mg/mL. Samples focused at 1500 V for 1 minute and then at 3000 V for 8 minutes.

Figure 8:
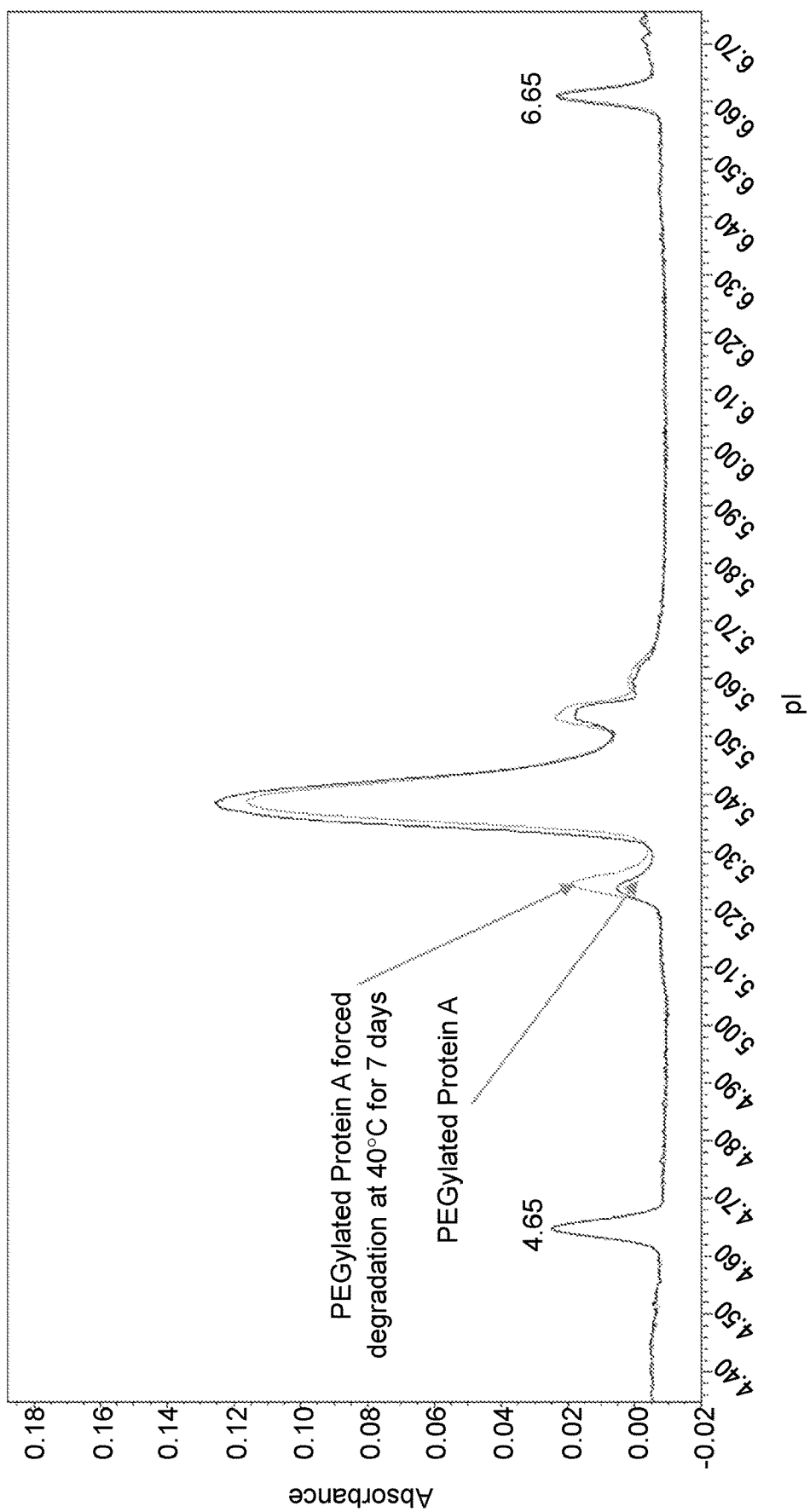

FIG. 8 shows electropherograms of (i) a control PEGylated Protein A sample and (ii) a PEGylated Protein A sample that has undergone forcet degradation at 40° C. for 7 days. The sample matrix contained 4% (v:v) PHARMALYTE® 3-10, 0.35% (w:v) methyl cellulose, 40 mM of glycine and 50 mM taurine. PEGylated Protein A samples were diluted in deionized water to 5 mg/mL and then further diluted in sample matrix to 0.5 mg/mL. Samples were focused at 1500 V for 1 minute and then at 3000 V for 8 minutes.

Figure 9:
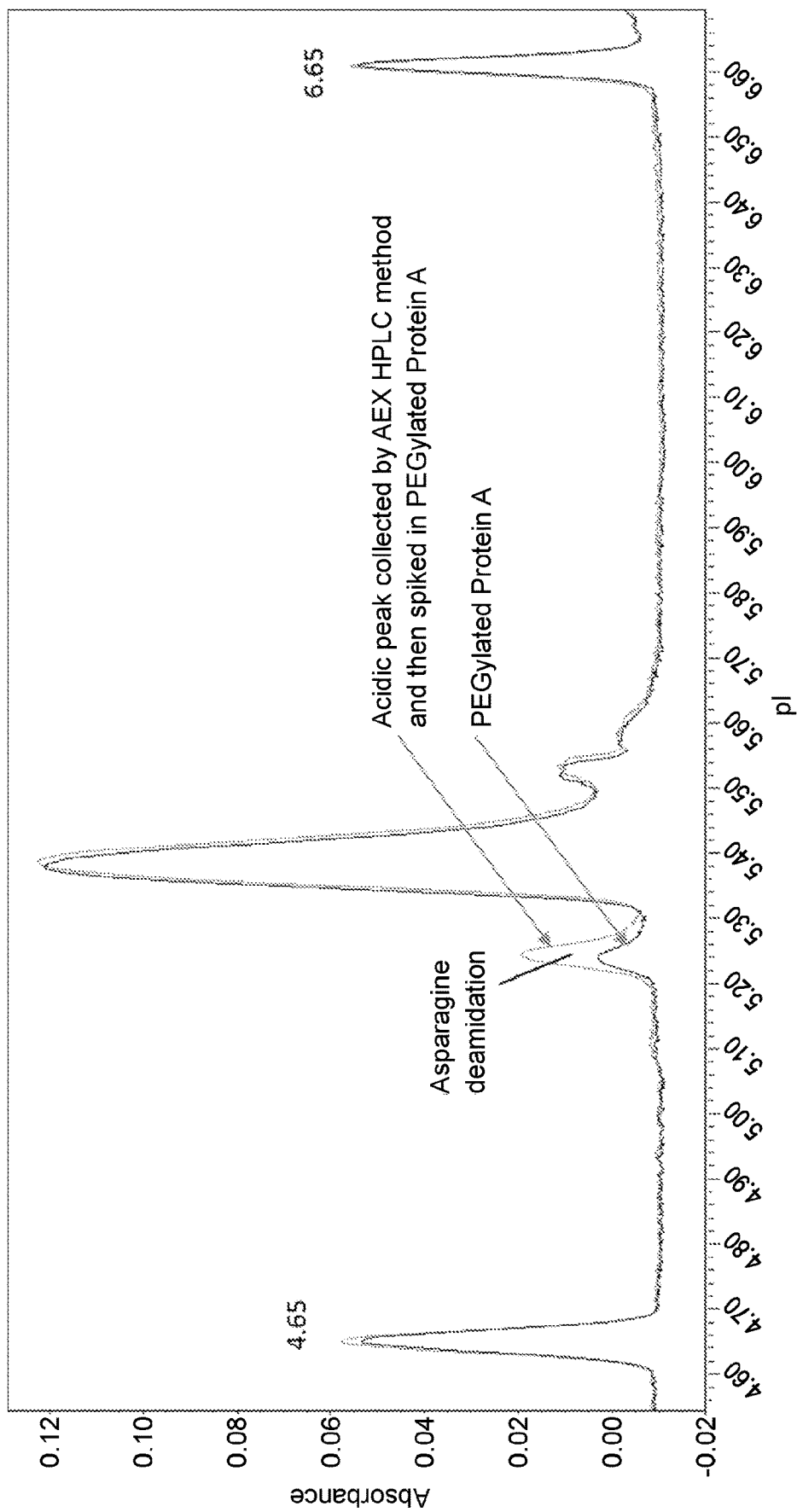

FIG. 9 shows electropherograms of (i) a control PEGylated Protein A sample and (ii) a PEGylated Protein A sample that has been spiked with asparagine deamidated PEGylated Protein A (peak at approx. pH 5.25 in FIG. 8) collected by AEX HPLC. The sample matrix contained 4% (v:v) PHARMALYTE® 3-10, 0.35% (w:v) methyl cellulose, 40 mM of glycine and 50 mM taurine. PEGylated Protein A samples were diluted in deionized water to 5 mg/mL and then further diluted in sample matrix to 0.5 mg/mL. Samples focused at 1500 V for 1 minute and then at 3000 V for 8 minutes.

DETAILED DESCRIPTION

PEGylation has been used as a strategy to enhance pharmacokinetic properties of therapeutic proteins by pharmaceutical industry. Imaged capillary isoelectric focusing (icIEF) is the current industry standard technology for isoelectric point (pI) determination and charge variant quantification of proteins and antibodies. However, resolving discrete peaks corresponding to charge variants of PEGylated proteins remains challenging. The present disclosure provides a sample novel matrix formula comprising with a combination of the additives glycine and taurine that significantly improves the separation of charge variants in PEGylated proteins. As a result, it is no longer necessary to conduct isoelectric focusing of proteins prior to PEGylation, which does not reflect the changes caused by PEGylation and purification processes. Thus, the sample matrix disclosed herein enables icIEF analysis of PEGylated proteins in their real conjugated states.

The sample matrices of the present disclosure can include glycine, which enables the separation of co-migrated PEGylated protein charge variants. The sample matrices can also include taurine, a non-essential amino acid used generally in protein formulations (Brosnan & Brosnan (2006) J Nutr. 136:1636-1640; Amino Acids: Chemistry, Biology and Medicine. Lubec & Rosenthal, Eds. Springer Science & Business Media, 2012), which further improves icIEF assay by depleting matrix induced baseline interferences. Accordingly, a sample matrix of the present disclosure including a combination of glycine and taurine enables icIEF separation of acidic and basic species from the main peak for PEGylated proteins, allowing the identification/separation, characterization and quantification of discrete PEGylated protein species. By using the sample matrices of the present disclosure to characterize PEGylated proteins by icIEF, repeatability, linearity, accuracy, sample stability, and method robustness are achieved.

Before the present disclosure is described in greater detail, it is to be understood that this disclosure is not limited to the particular compositions or process steps described, as such can, of course, vary. As will be apparent to those of skill in the art upon reading this disclosure, each of the individual aspects described and illustrated herein has discrete components and features which can be readily separated from or combined with the features of any of the other several aspects without departing from the scope or spirit of the present disclosure. Any recited method can be carried out in the order of events recited or in any other order which is logically possible.

The headings provided herein are not limitations of the various aspects of the disclosure, which can be defined by reference to the specification as a whole. It is also to be understood that the terminology used herein is for the purpose of describing particular aspects only, and is not intended to be limiting, since the scope of the present disclosure will be limited only by the appended claims.

Terms

In order that the present disclosure can be more readily understood, certain terms are first defined. As used in this application, except as otherwise expressly provided herein, each of the following terms shall have the meaning set forth below. Additional definitions are set forth throughout the application.

The disclosure includes aspects in which exactly one member of the group is present in, employed in, or otherwise relevant to a given product or process. The disclosure includes aspects in which more than one, or all the group members are present in, employed in, or otherwise relevant to a given product or process.

Unless defined otherwise, all technical and scientific terms used herein have the same meaning as commonly understood by one of ordinary skill in the art to which this disclosure is related. For example, the Concise Dictionary of Biomedicine and Molecular Biology, Juo, Pei-Show, 2nd ed., 2002, CRC Press; The Dictionary of Cell and Molecular Biology, 3rd ed., 1999, Academic Press; and the Oxford Dictionary of Biochemistry And Molecular Biology, Revised, 2000, Oxford University Press, provide one of skill with a general dictionary of many of the terms used in this disclosure.

Units, prefixes, and symbols are denoted in their Système International de Unites (SI) accepted form. Numeric ranges are inclusive of the numbers defining the range. The headings provided herein are not limitations of the various aspects of the disclosure, which can be had by reference to the specification as a whole. Accordingly, the terms defined immediately below are more fully defined by reference to the specification in its entirety.

The singular forms "a", "an" and "the" include plural referents unless the context clearly dictates otherwise. The terms "a" (or "an"), as well as the terms "one or more," and "at least one" can be used interchangeably herein. In certain aspects, the term "a" or "an" means "single." In some aspects, the term "a" or "an" includes "two or more" or "multiple." E.g., reference to a carrier ampholyte encompasses a single carrier ampholyte mixture or a combination thereof.

The term "about" as used herein to a value or composition that is within an acceptable error range for the particular value or composition as determined by one of ordinary skill in the art, which will depend in part on how the value or composition is measured or determined, i.e., the limitations of the measurement system. For example, "about" can mean within 1 or more than 1 standard deviation per the practice in the art. Alternatively, "about" can mean a range of up to 20%.

When particular values or compositions are provided in the application and claims, unless otherwise stated, the meaning of "about" should be assumed to be within an acceptable error range for that particular value or composition. When the term "about" is used in conjunction with a numerical range, it modifies that range by extending the boundaries above and below the numerical values set forth. Thus, "about 10-20" means "about 10 to about 20." In general, the term "about" can modify a numerical value above and below the stated value by a variance of, e.g., 10 percent, up or down (higher or lower).

"And/or" where used herein is to be taken as specific disclosure of each of the two specified features or components with or without the other. Thus, the term "and/or" as used in a phrase such as "A and/or B" herein is intended to include "A and B," "A or B," "A" (alone), and "B" (alone). Likewise, the term "and/or" as used in a phrase such as "A, B, and/or C" is intended to encompass each of the following aspects: A, B, and C; A, B, or C; A or C; A or B; B or C; A and C; A and B; B and C; A (alone); B (alone); and C (alone).

As used herein, the term "approximately," as applied to one or more values of interest, refers to a value that is similar to a stated reference value. In certain aspects, the term "approximately" refers to a range of values that fall within 10%, 9%, 8%, 7%, 6%, 5%, 4%, 3%, 2%, 1%, or less in either direction (greater than or less than) of the stated reference value unless otherwise stated or otherwise evident from the context (except where such number would exceed 100% of a possible value).

It is understood that wherever aspects are described herein with the language "comprising," otherwise analogous aspects described in terms of "consisting of" and/or "consisting essentially of" are also provided.

The terms "polypeptide," "peptide," and "protein" are used interchangeably herein to refer to polymers of amino acids of any length. The polymer can comprise modified amino acids. The terms also encompass an amino acid polymer that has been modified naturally or by intervention; for example, disulfide bond formation, glycosylation, lipidation, acetylation, phosphorylation, or any other manipulation or modification, such as conjugation with a labeling component. Also included within the definition are, for example, polypeptides containing one or more analogs of an amino acid (including, for example, unnatural amino acids such as homocysteine, ornithine, p-acetylphenylalanine, D-amino acids, and creatine), as well as other modifications known in the art. In a particular aspect of the present disclosure, the polypeptide is a PEGylated polypeptide.

The term, as used herein, refers to proteins, polypeptides, and peptides of any size, structure, or function. Polypeptides include gene products, naturally occurring polypeptides, synthetic polypeptides, homologs, orthologs, paralogs, fragments and other equivalents, variants, and analogs of the foregoing. A polypeptide can be a single polypeptide or can be a multi-molecular complex such as a dimer, trimer or tetramer. They can also comprise single chain or multichain polypeptides. Most common disulfide linkages are found in multichain polypeptides. The term polypeptide can also apply to amino acid polymers in which one or more amino acid residues are an artificial chemical analogue of a corresponding naturally occurring amino acid. In some aspects, a "peptide" can be less than or equal to 50 amino acids long, e.g., about 5, 10, 15, 20, 25, 30, 35, 40, 45, or 50 amino acids long.

In a particular aspect of the present disclosure, a polypeptide has been derivatized, e.g., chemically, to incorporate a water soluble polymer capable of enhancing a polypeptide property, e.g., plasma half-life. In some aspects, the polypeptide is PEGylated, i.e., it comprises at least one PEG covalently attached to a polypeptide chain.

As described herein, any concentration range, percentage range, ratio range or integer range is to be understood to include the value of any integer within the recited range and, when appropriate, fractions thereof (such as one tenth and one hundredth of an integer), unless otherwise indicated.

A "recombinant" polypeptide or protein refers to a polypeptide or protein produced via recombinant DNA technology. Recombinantly produced polypeptides and proteins expressed in engineered host cells (e.g., CHO cells) are considered isolated for the purpose of the disclosure, as are native or recombinant polypeptides which have been separated, fractionated, or partially or substantially purified by any suitable technique. In some aspects of the present disclosure, a recombinant polypeptide can be an antibody.

The antibodies disclosed herein, e.g., "Antibody B" can be recombinantly produced using methods known in the art. The proteins (e.g., "Protein A" or "Antibody B") disclosed herein can also be chemically synthesized.

icIEF Sample Matrices and Methods of Use

The present disclosure provides sample matrices for isoelectric focusing, e.g., capillary isoelectric focusing (cIEF) or imaged capillary isoelectric focusing (icIEF), capable of effectively separating acidic and basic species from a main peak for proteins or peptides derivatized with a polymeric hydrophilic moiety, e.g., PEGylated proteins.

Isoelectric focusing is a technique for separating molecules by differences in their isoelectric point (pI), i.e., the pH at which they have a net zero charge. icIEF involves using ampholyte (amphoteric electrolyte) solutions to generate a pH gradient within a separation channel (i.e., a fluid channel connecting a positive electrode and a negative electrode, e.g., a capillary) across which a separation voltage is applied. Negatively charged molecules migrate through the pH gradient in the medium toward the positive electrode while positively charged molecules move toward the negative electrode. An analyte (e.g., a protein or other molecule) that is in a pH region below its isoelectric point (pI) will be positively charged and so will migrate towards the cathode (i.e., the negatively charged electrode). The protein's overall net charge will decrease as it migrates through a gradient of increasing pH (due, for example, to protonation of carboxyl groups or other negatively charged functional groups) until it reaches the pH region that corresponds to its pI, at which point it has no net charge and so migration ceases. Conversely, an analyte that is in a pH region above its isoelectric point (pI) will be negatively charged and so will migrate towards the anode (i.e., the positively charged electrode). As a result, a mixture of analytes (e.g., proteins) separates based on their relative charge content due to acidic and basic amino acid residues, N- and C-terminal charges, or other charges present in heterologous moieties attached to the analyte (e.g., PEG in a PEGylated protein). At the end of the icIEF run, the different species in the analyte become focused into sharp stationary bands with each analyte species (e.g., charge variants of a PEGylated protein) positioned at a point in the pH gradient corresponding to its pI. The technique is capable of providing extremely high resolution, i.e., being able to distinguish between proteins differing by a single charge, which are fractionated into separate bands. cIEF is much faster than gel IEF but the resolution of the separation can be damaged while the peak is being pushed. Imaged cIEF (icIEF) instruments and cartridges employ whole-column imaging detection (WCID) technology that allows the cIEF process to be imaged in real time. Thus, icIEF separations do not require mobilization so, when compared to traditional cIEF with single-point detection, sample analysis is faster and more precise. General methods for conducting cIEF are described, for example, by Kilar, F., "Isoelectric Focusing in Capillaries," in CRC Handbook on Capillary Electrophoresis: A Practical Approach, CRC Press, Inc., chapter 4, pp. 95-109 (1994); and Schwartz, H., and T. Pritchett, "Separation of Proteins and Peptides by Capillary Electrophoresis: Application to Analytical Biotechnology," Part No. 266923 (Beckman-Coulter, Fullerton, Calif., 1994); Wehr, T., Rodriquez-Diaz, R., and Zhu, M., "Capillary Electrophoresis of Proteins," (Marcel Dekker, NY, 1999), which are incorporated herein by reference in their entireties.

The present disclosure provides imaged capillary isoelectric focusing (icIEF) sample matrices comprising glycine and/or taurine. As used herein, the terms "icIEF sample matrix" and "sample matrix" are used interchangeably to refer to a combination of reagents that can be admixed with an analyte (e.g., a PEGylate protein) prior to subjecting the admixture to icIEF. Sample matrices for icIEF comprise ampholytes and one or more additives. For example, the sample matrix can comprise additives to decrease the electroosmotic flow, allow better protein solubilization, and limit diffusion inside the capillary of fluid channel by increasing the viscosity of the electrolyte, e.g., methylcellulose or glycerol. The sample matrix can also comprise stabilizing additives to reduce protein aggregation, solubilize proteins in sample matrix, and therefore improve assay repeatability such as urea, formamide, or sucrose. In addition, the sample matrix can comprise pI reference standards.

In some aspects, an icIEF sample matrix disclosed herein contains glycine at a concentration between about 1 mM and about 200 mM. In some aspects, glycine is at a concentration between about 1 mM and about 150 mM, about 1 mM and about 100 mM, about 1 mM and about 90 mM, about 1 mM and about 80 mM, about 1 mM and about 70 mM, about 1 mM and about 60 mM, about 1 mM and about 50 mM, about 1 mM and about 40 mM, about 10 mM and about 200 mM, about 10 mM and about 150 mM, about 10 mM and about 100 mM, about 10 mM and about 90 mM, about 10 mM and about 80 mM, about 10 mM and about 70 mM, about 10 mM and about 60 mM, about 10 mM and about 50 mM, about 10 mM and about 40 mM, about 20 mM and about 200 mM, about 20 mM and about 150 mM, about 20 mM and about 100 mM, about 20 mM and about 90 mM, about 20 mM and about 80 mM, about 20 mM and about 70 mM, about 20 mM and about 60 mM, about 20 mM and about 50 mM, about 20 mM and about 40 mM, about 30 mM and about 200 mM, about 30 mM and about 150 mM, about 30 mM and about 100 mM, about 30 mM and about 90 mM, about 30 mM and about 80 mM, about 30 mM and about 70 mM, about 30 mM and about 60 mM, about 30 mM and about 50 mM, about 30 mM and about 40 mM, about 40 mM and about 200 mM, about 40 mM and about 150 mM, about 40 mM and about 100 mM, about 40 mM and about 90 mM, about 40 mM and about 80 mM, about 40 mM and about 70 mM, about 40 mM and about 60 mM, or about 40 mM and about 50 mM.

In some aspects of the icIEF sample matrix, glycine is at a concentration of about 10 mM, about 15 mM, about 20 mM, about 25 mM, about 30 mM, about 35 mM, about 40 mM, about 45 mM, about 50 mM, about 55 mM, about 60 mM, about 65 mM, about 70 mM, about 75 mM, about 80 mM, about 85 mM, about 90 mM, about 95 mM, about 100 mM, about 105 mM, about 110 mM, about 115 mM, or about 120 mM. In some aspects, glycine is at a concentration between about 30 mM and about 50 mM. In some aspects, glycine is at a concentration between about 36 mM and about 44 mM. In some aspects, glycine is at a concentration of about 40 mM. In general, the concentration of glycine can be adjusted according, e.g., to the particular characteristics of the instrument used, type of capillary used, or protein sample used, in order to achieve optimal separation between protein charge variants, e.g., different PEGylated protein charge variants.

In some aspects of the icIEF sample matrix, taurine is at a concentration between about 1 mM and about 200 mM. In some aspects, taurine is at a concentration between about 1 mM and about 150 mM, about 1 mM and about 100 mM, about 1 mM and about 90 mM, about 1 mM and about 80 mM, about 1 mM and about 70 mM, about 1 mM and about 60 mM, about 1 mM and about 50 mM, about 1 mM and about 40 mM, about 10 mM and about 200 mM, about 10 mM and about 150 mM, about 10 mM and about 100 mM, about 10 mM and about 90 mM, about 10 mM and about 80 mM, about 10 mM and about 70 mM, about 10 mM and about 60 mM, about 10 mM and about 50 mM, about 10 mM and about 40 mM, about 20 mM and about 200 mM, about 20 mM and about 150 mM, about 20 mM and about 100 mM, about 20 mM and about 90 mM, about 20 mM and about 80 mM, about 20 mM and about 70 mM, about 20 mM and about 60 mM, about 20 mM and about 50 mM, about 20 mM and about 40 mM, about 30 mM and about 200 mM, about 30 mM and about 150 mM, about 30 mM and about 100 mM, about 30 mM and about 90 mM, about 30 mM and about 80 mM, about 30 mM and about 70 mM, about 30 mM and about 60 mM, about 30 mM and about 50 mM, about 30 mM and about 40 mM, about 40 mM and about 200 mM, about 40 mM and about 150 mM, about 40 mM and about 100 mM, about 40 mM and about 90 mM, about 40 mM and about 80 mM, about 40 mM and about 70 mM, about 40 mM and about 60 mM, or about 40 mM and about 50 mM.

In some aspects of the icIEF sample matrix, taurine is at a concentration of about 10 mM, about 15 mM, about 20 mM, about 25 mM, about 30 mM, about 35 mM, about 40 mM, about 45 mM, about 50 mM, about 55 mM, about 60 mM, about 65 mM, about 70 mM, about 75 mM, about 80 mM, about 85 mM, about 90 mM, about 95 mM, about 100 mM, about 105 mM, about 110 mM, about 115 mM, or about 120 mM. In some aspects, taurine is at a concentration between about 40 mM and about 60 mM. In some aspects, taurine is at a concentration between about 45 mM and about 55 mM. In some aspects, taurine is at a concentration of about 50 mM. In general, the concentration of taurine can be adjusted according, e.g., to the particular characteristics of the instrument used, type of capillary used, or protein sample use, in order to achieve optimal depleting or reduction of sample matrix induced baseline interferences, e.g., baseline interferences due to the presence of glycine in the sample matrix.

In some aspects, the icIEF sample matrix comprises both glycine and taurine. In some aspects, the icIEF sample matrix comprises (i) glycine at a concentration between about 1 mM and about 200 mM, and (ii) taurine at a concentration between about 1 mM and about 200 mM.

In some aspects, the icIEF sample matrix comprises (i) glycine at a concentration between about 1 mM and about 150 mM, about 1 mM and about 100 mM, about 1 mM and about 90 mM, about 1 mM and about 80 mM, about 1 mM and about 70 mM, about 1 mM and about 60 mM, about 1 mM and about 50 mM, about 1 mM and about 40 mM, about 10 mM and about 200 mM, about 10 mM and about 150 mM, about 10 mM and about 100 mM, about 10 mM and about 90 mM, about 10 mM and about 80 mM, about 10 mM and about 70 mM, about 10 mM and about 60 mM, about 10 mM and about 50 mM, about 10 mM and about 40 mM, about 20 mM and about 200 mM, about 20 mM and about 150 mM, about 20 mM and about 100 mM, about 20 mM and about 90 mM, about 20 mM and about 80 mM, about 20 mM and about 70 mM, about 20 mM and about 60 mM, about 20 mM and about 50 mM, about 20 mM and about 40 mM, about 30 mM and about 200 mM, about 30 mM and about 150 mM, about 30 mM and about 100 mM, about 30 mM and about 90 mM, about 30 mM and about 80 mM, about 30 mM and about 70 mM, about 30 mM and about 60 mM, about 30 mM and about 50 mM, about 30 mM and about 40 mM, about 40 mM and about 200 mM, about 40 mM and about 150 mM, about 40 mM and about 100 mM, about 40 mM and about 90 mM, about 40 mM and about 80 mM, about 40 mM and about 70 mM, about 40 mM and about 60 mM, or about 40 mM and about 50 mM, and (ii)

taurine at a concentration between about 1 mM and about 150 mM, about 1 mM and about 100 mM, about 1 mM and about 90 mM, about 1 mM and about 80 mM, about 1 mM and about 70 mM, about 1 mM and about 60 mM, about 1 mM and about 50 mM, about 1 mM and about 40 mM, about 10 mM and about 200 mM, about 10 mM and about 150 mM, about 10 mM and about 100 mM, about 10 mM and about 90 mM, about 10 mM and about 80 mM, about 10 mM and about 70 mM, about 10 mM and about 60 mM, about 10 mM and about 50 mM, about 10 mM and about 40 mM, about 20 mM and about 200 mM, about 20 mM and about 150 mM, about 20 mM and about 100 mM, about 20 mM and about 90 mM, about 20 mM and about 80 mM, about 20 mM and about 70 mM, about 20 mM and about 60 mM, about 20 mM and about 50 mM, about 20 mM and about 40 mM, about 30 mM and about 200 mM, about 30 mM and about 150 mM, about 30 mM and about 100 mM, about 30 mM and about 90 mM, about 30 mM and about 80 mM, about 30 mM and about 70 mM, about 30 mM and about 60 mM, about 30 mM and about 50 mM, about 30 mM and about 40 mM, about 40 mM and about 200 mM, about 40 mM and about 150 mM, about 40 mM and about 100 mM, about 40 mM and about 90 mM, about 40 mM and about 80 mM, about 40 mM and about 70 mM, about 40 mM and about 60 mM, or about 40 mM and about 50 mM.

In some aspects, the icIEF sample matrix comprises (i) glycine at a concentration of about 10 mM, about 15 mM, about 20 mM, about 25 mM, about 30 mM, about 35 mM, about 40 mM, about 45 mM, about 50 mM, about 55 mM, about 60 mM, about 65 mM, about 70 mM, about 75 mM, about 80 mM, about 85 mM, about 90 mM, about 95 mM, about 100 mM, about 105 mM, about 110 mM, about 115 mM, or about 120 mM, and (ii) taurine at a concentration of about 10 mM, about 15 mM, about 20 mM, about 25 mM, about 30 mM, about 35 mM, about 40 mM, about 45 mM, about 50 mM, about 55 mM, about 60 mM, about 65 mM, about 70 mM, about 75 mM, about 80 mM, about 85 mM, about 90 mM, about 95 mM, about 100 mM, about 105 mM, about 110 mM, about 115 mM, or about 120 mM.

In some aspects, the icIEF sample matrix comprises (i) glycine at a concentration between about 30 mM and about 50 mM, and (ii) taurine at a concentration between about 40 mM and about 60 mM. In some aspects, the icIEF sample matrix comprises (i) glycine at a concentration between about 36 mM and about 44 mM, and (ii) taurine at a concentration between about 45 mM and about 55 mM. In some aspects, the icIEF sample matrix comprises (i) glycine at a concentration of about 40 mM, and (ii) taurine at a concentration of about 50 mM.

In some aspects, the icIEF sample matrix comprises (i) a concentration of glycine that can achieve optimal separation between protein charge variants, e.g., PEGylated protein charge variants, and (ii) a concentration of taurine that can achieve optimal depleting or reduction of sample matrix induced baseline interferences, e.g., baseline interferences due to the presence of glycine in the sample matrix.

In some aspects, the icIEF sample matrix further comprises a carrier ampholyte. The terms "carrier ampholyte" and "ampholyte" are used interchangeably and refer to amphoteric molecules that contain both acidic and basic groups and will exist mostly as zwitterions in a certain range of pH values. Ampholytes are used to establish a stable pH gradient for use in isoelectric focusing techniques, e.g., icIEF. In the presence of an applied electric field, carrier ampholytes partition into smooth pH gradients that increase linearly from the anode to the cathode. The pH at which the average charge is zero is known as the molecule's isoelectric point (pI). In some aspects, the carrier ampholyte comprises a mixture of small molecules (e.g., about 300-1,000 Da) containing multiple aliphatic amino and carboxylate groups that have closely spaced pI values and good buffering capacity. In some aspects, the ampholyte comprises has a high buffering capacity per pH unit, a linear pH gradient, and even conductivity across the ampholyte.

A number of different ampholytes can be utilized to generate the pH gradient, including numerous commercially available ampholyte solutions. The selection of ampholytes and the breadth of the ampholyte gradient can impact the resolution that is achieved by icIEF. For example, narrow ampholyte gradients increase the number of theoretical plates in the separation and can be beneficial for higher resolution separation over narrow pI ranges.

Any of a variety of ampholytes known to those of skill in the art can be used in the disclosed compositions and methods including, but not limited to, phosphoric acid/sodium hydroxide, glutamic acid/lysine, formic acid/dimethylamine, or commercial carrier ampholyte mixtures Four families of commercially available carrier ampholytes are generally used in icIEF: PHARMALYTE® (GE Healthcare, Pittsburgh, PA), BIO-LYTE® (BioRad, Hercules, CA), SERVALYTE® (Biophoretics, Reno, NV) and AMPHOLINE® (GE Healthcare, Pittsburgh, PA). In some aspects, the ampholytes used in the icIEF sample matrix of the present disclosure are selected from PHARMALYTE®, BIOLYTE®, SERVALYT®, AMPHOLINE®, and combinations thereof. In some aspects, the carrier ampholyte is a broad pH range carrier ampholyte. In some aspects, the carrier ampholyte is a narrow pH range carrier ampholyte.

PHARMALYTE® carrier ampholytes are used for icIEF conducted within a broad pH range scope, e.g., from about pH 3 to about pH 10, and or within a narrow pH range, e.g., between about 2.5 and about 5, between about 4 and about 6.5, between about 5 and about 8, between about 8 and about 10.5, between about 4.2 and about 4.9, between about 4.5 and about 5.4, between about 5 and about 6, or between about 6.7 and about 7.7.

Almost all current cIEF detection is conducted using UV detection at 280 nm. For cIEF, on-line UV detection is generally used. For icIEF, real-time monitoring is performed using a CCD camera. PHARMALYTE® carrier ampholytes are especially used when it is desirable to use carrier ampholytes with low background UV absorption, since PHARMALYTE® carrier ampholytes have low background UV absorption along their entire pH gradient.

The commercial names of the PHARMALYTE® carrier ampholytes denote their pH range covered; e.g., a PHARMALYTE® 3-5 carrier ampholyte covers a pH range between 3 and 5. In some aspects, the carrier ampholyte is PHARMALYTE® 3-10, PHARMALYTE®3-4, PHARMALYTE®3-5, PHARMALYTE® 3-6, PHARMALYTE® 3-7, PHARMALYTE® 3-8, PHARMALYTE® 4-7, PHARMALYTE® 4-8, PHARMALYTE® 5-8, PHARMALYTE® 5-9, PHARMALYTE® 5-10, PHARMALYTE® 6-8, PHARMALYTE® 6-9, PHARMALYTE® 6-10, PHARMALYTE® 7-9, PHARMALYTE® 7-10, PHARMALYTE® 8-10, or any combination thereof.

BIOLYTE® carrier ampholytes can also be used for broad pH range separations (e.g., between about 3.5 and about 9.5) and also for narrower scope separations (e.g., between about 3 and about 5; between about 4 and about 6; between about 5 and about 7; between about 5 and about 8; between about 6 and about 8; between about 7 and about 9; or between about 8 and about 10).

SERVALYTE® carrier ampholytes can also be used for broad pH range separations (e.g., between about 2 and about 9; between about 2 and about 11; between about 3 and about 7; between about 3 and about 10; between about 4 and about 9; or between about 5 and about 9), and for narrow pH range separations (e.g., between about 2 and about 4; between about 3 and about 4; between about 3 and about 5; between about 3 and about 6; between about 4 and about 5; between about 4 and about 6; between about 4 and about 7; between about 5 and about 6; between about 5 and about 7; between about 5 and about 8; between about 6 and about 7; between about 6 and about 8; between about 6 and about 9; between about 7 and about 9; or between about 9 and about 11).

In some aspects, the carrier ampholyte comprises one or more PHARMALYTE® carrier ampholytes (e.g., PHARMALYTE® 3-10), one or more BIOLYTE® carrier ampholytes, one or more SERVALYTE® carrier ampholytes, or any combination thereof. In some aspects, a combination of carrier ampholytes can comprise complementing ranges providing coverage over a broad range, e.g., a carrier ampholyte covering pH 2 to pH 4, a second carrier ampholyte covering pH 4 to pH 8, and a third carrier ampholyte covering pH 8 to pH 11. In some aspects, a combination of carrier ampholytes can be designed to provide particularly high resolution within a narrow pH range or ranges, e.g., a mixture selected to particular resolve charged species with pI between 8 and 9 can comprise a first carrier ampholyte covering pH 2 to pH 8, a second carrier ampholyte covering pH 8 to pH 9.

A person of ordinary skill in the art would understand that the election of a particular carrier ampholyte can be determined by the charge of the analyte and, e.g., preliminary data obtained, e.g., using gel IEF. Thus, a protein with a pI of approximately 6 determined, e.g., using any IEF technique, which has been subsequently derivatized with a certain PEG can be analyzed using icIEF and a carrier ampholyte covering a pH range that encompasses the pH of the non-derivatized form of the protein, e.g., PHARMALYTE® 4-8.

In some specific aspects, a sample matrix disclosed herein can comprise a carrier ampholyte covering a broad pH range, which would be appropriate for most separations except for those involving highly acidic or highly basic analytes (e.g., highly acidic or highly basic proteins). Accordingly, in the some aspects, the sample matrix of the present disclosure comprises a broad pH range carrier ampholyte covering, e.g., pH 2 to pH 11 (e.g., SERVALYTE®2-11) or pH 3 to pH 10 (e.g., PHARMALYTE®3-10). In a particular aspect, the broad pH range carrier ampholyte is a PHARMALYTE® carrier ampholyte. In a more particular aspect, the broad pH range carrier ampholyte is PHARMALYTE® 3-10.

In some aspects, the carrier ampholyte (or combination thereof) is at a concentration of about 1% (v:v) to about 10% (v:v). In some aspects, the carrier ampholyte (or combination thereof) is at a concentration between 1% (v:v) and about 2% (v:v), between about 2% (v:v) and about 3% (v:v), between about 3% (v:v) and about 4% (v:v), between about 4% (v:v) and about 5% (v:v), between about 5% (v:v) and about 6% (v:v), between about 6% (v:v) and about 7% (v:v), between about 7% (v:v) and about 8% (v:v), between about 8% (v:v) and about 9% (v:v), or between about 9% (v:v) and about 10% (v:v). In some aspects, the carrier ampholyte (or combination thereof) is at a concentration of about 2% (v:v) to about 9% (v:v). In some aspects, the carrier ampholyte (or combination thereof) is at a concentration of about 3% (v:v) to about 8% (v:v). In some aspects, the carrier ampholyte (or combination thereof) is at a concentration of about 2% (v:v) to about 7% (v:v). In some aspects, the carrier ampholyte (or combination thereof) is at a concentration of about 3% (v:v) to about 6% (v:v). In some aspects, the carrier ampholyte (or combination thereof) is at a concentration of about 2% (v:v) to about 5% (v:v). In some aspects, the carrier ampholyte (or combination thereof) is at a concentration of about 3% (v:v) to about 5% (v:v). In some aspects, the carrier ampholyte is at a concentration of about 1% (v:v), about 2% (v:v), about 3% (v:v), about 4% (v:v), about 5% (v:v), about 6% (v:v), about 7% (v:v), about 8% (v:v), about 9% (v:v), or about 10% (v:v). In some aspects, the carrier ampholyte is at a concentration of about 3.6% (v:v) to 4.4% (v:v). In some aspects, the carrier ampholyte is at a concentration of about 3.6% (v:v), about 3.7% (v:v), about 3.8% (v:v), about 3.9% (v:v), about 4% (v:v), about 4.1% (v:v), about 4.2% (v:v), about 4.3% (v:v), or about 4.4% (v:v). In some aspects, the carrier ampholyte is at a concentration of about 4% (v:v).

In some aspects, the icIEF sample matrix further comprises a compound that increases its viscosity, e.g., methyl cellulose or derivative thereof (e.g., hydroxy propyl methyl cellulose). Optionally, the use of a viscosity increasing compound such as methyl cellulose in the sample matrix can be obviated by the use of a capillary coating, e.g., an acrylamide derivative coating on the surface of the icIEF capillary.

In some aspects, an icIEF sample matrix disclosed herein comprises methyl cellulose at a concentration between about 0.01% (w:v) and about 1% (w:v). In some aspects, methyl cellulose is at a concentration of about 0.01% (w:v), about 0.05% (w:v), about 0.1% (w:v), about 0.15% (w:v), about 0.2% (w:v), about 0.25% (w:v), about 0.3% (w:v), about 0.35% (w:v), about 0.4% (w:v), about 0.45% (w:v), about 0.5% (w:v), about 0.6% (w:v), about 0.7% (w:v), about 0.8% (w:v), about 0.9% (w:v) or about 1% (w:v). In some aspects, methyl cellulose is at a concentration between about 0.01 (w:v) and about 0.1% (w:v), between about 0.1% (w:v) and about 0.2% (w:v), between about 0.2% (w:v) and about 0.3% (w:v), between about 0.3% (w:v) and about 0.4% (w:v), between about 0.4% (w:v) and about 0.5% (w:v), between about 0.5% (w:v) and about 0.6% (w:v), between about 0.6% (w:v) and about 0.7% (w:v), between about 0.7% (w:v) and about 0.8% (w:v), between about 0.8% (w:v) and about 0.9% (w:v), or about 0.9% (w:v) and about 1% (w:v). In some specific aspects, methyl cellulose is at a concentration of about 0.35% (w:v).

In some aspects, the icIEF sample matrix comprises at least one PHARMALYTE® carrier ampholyte (e.g., PHARMALYTE® 3-10), and glycine (e.g., about 40 mM). In some aspects, the icIEF sample matrix comprises at least one PHARMALYTE® carrier ampholyte (e.g., PHARMALYTE® 3-10), and taurine (e.g., about 50 mM). In some aspects, the icIEF sample matrix comprises at least one PHARMALYTE® carrier ampholyte (e.g., PHARMALYTE® 3-10), glycine (e.g., about 40 mM) and taurine (e.g., about 50 mM). In some aspects, the icIEF sample matrix comprises at least one PHARMALYTE® carrier ampholyte (e.g., PHARMALYTE® 3-10), methyl cellulose, and glycine (e.g., about 40 mM). In some aspects, the icIEF sample matrix comprises at least one PHARMALYTE® carrier ampholyte (e.g., PHARMALYTE® 3-10), methyl cellulose, and taurine (e.g., about 50 mM). In some aspects, the icIEF sample matrix comprises at least one PHARMALYTE® carrier ampholyte (e.g., PHARMALYTE® 3-10), methyl cellulose, glycine (e.g., about 40 mM), and taurine (e.g., about 50 mM).

In some aspects, the icIEF sample matrix comprises about 4% (v:v) PHARMALYTE® 3-10, about 0.35% (w:v) methyl cellulose, and about 40 mM glycine. In some aspects, the icIEF sample matrix comprises about 4% (v:v) PHARMALYTE® 3-10, about 0.35% (w:v) methyl cellulose, and about 50 mM taurine. In some aspects, the icIEF sample matrix comprises about 4% (v:v) PHARMALYTE® 3-10, about 0.35% (w:v) methyl cellulose, about 40 mM glycine and about 50 mM taurine.

In some aspects, the icIEF sample matrix of the present disclosure can be spiked with one or more known pI standards to assess the performance of the separation. Accordingly, any of the icIEF sample matrices disclosed herein can comprise a series of pI standards. Any of a variety of pI standards known in the art can be used in the disclosed methods and devices for calculating the isoelectric point for separated analyte peaks provided that they can be visualized using an appropriate imaging technique. In general, there are two types of pI markers used in icIEF applications: protein pI markers and synthetic small molecule pI markers. Protein pI markers are based on specific proteins that have commonly accepted pI values. They generally require the adoption of stringent storage conditions, can exhibit poor stability, and thus can yield multiple peaks in CIEF. Synthetic small molecules (preferably non-peptide molecules so that they can be used in enzyme separations) are generally more stable during storage and will focus to a single peak in icIEF. There are a variety of protein pI markers or synthetic small molecule pI markers available, e.g., the small molecule pI markers available from Advanced Electrophoresis Solutions, Ltd. (Cambridge, Ontario, Canada).

In some aspects, icIEF is performed on a mixture comprising an icIEF sample matrix disclosed herein and an analyte (or more than one analyte). In some aspects, the analyte comprises a protein, a peptide, or a drug-protein conjugate comprising a water soluble polymeric moiety, e.g., a polyethylene glycol (PEG), a polyglycerol (PG), a poly(propylene glycol) (PPG), a $C_3$, $C_4$, $C_5$, $C_6$, $C_7$, $C_8$, $C_9$ or $C_{10}$ alkyl group comprising three, four, five, six, seven, eight, nine or ten substituent functions independently selected from the group including an amine-, hydroxy-, thiol-, carboxylic acid, carboxylic amide, sulfonic acid or sulfonamide function, or a polymer or copolymer comprising a plurality of any of the monomers hydroxypropyl methacrylate (HPMA), hydroxyethyl methacrylate (HEMA), vinyl alcohol (VA), vinyl pyrrolidone (VP), N-isopropyl acrylamide (NIPAM) and/or PEG methacrylate (PEGMA) with n and m independently having a value from 3 to 200. In a particular aspect, the analyte is a PEGylated antibody.

Accordingly, in some aspects, the present disclosure also provides compositions comprising an icIEF sample matrix disclosed herein and an analyte disclosed herein, e.g., a PEGylated protein or peptide. PPG is less toxic than PEG, so many biological products are now produced using PPG instead of PEG.

In some aspects, the PEG is characterized by the formula $R^3$—(O—$CH_2$—$CH_2$)$_n$— or by the formula $R^3$—(O—$CH_2$-$CH_2$)$_n$—O— with $R^3$ being hydrogen, methyl or ethyl and n having a value from 2 to 200. In some aspects, the PEG has the formula

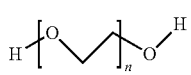 (formula I)

wherein n is 1 to 1000. In some aspects the —O—H group of formula I can be replaced to with a —O—$CH_3$ (methoxy). Accordingly, the disclosures below related to PEG are equally applicable to PEG derivatives such as methoxy PEG.

In some aspects, n has a value of 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, 160, 161, 162, 163, 164, 165, 166, 167, 168, 169, 170, 171, 172, 173, 174, 175, 176, 177, 178, 179, 189, 181, 182, 183, 184, 185, 186, 187, 188, 189, 190, 191, 192, 193, 194, 195, 196, 197, 198, 199, or 200.

In some aspects, n is at least about 10, at least about 20, at least about 30, at least about 40, at least about 50, at least about 60, at least about 70, at least about 80, at least about 90, at least about 100, at least about 110, at least 120, at least about 130, at least about 140, at least about 150, at least about 160, at least about 170, at least about 180, at least about 190, at least about 200, at least about 210, at least about 220, at least about 230, at least about 240, at least about 250, at least about 260, at least about 270, at least about 280, at least about 290, at least about 300, at least about 310, at least about 320, at least about 330, at least about 340, at least about 350, at least about 360, at least about 370, at least about 380, at least about 390, at least about 400, at least about 410, at least about 420, at least about 430, at least about 440, at least about 450, at least about 460, at least about 470, at least about 480, at least about 490, at least about 500, at least about 510, at least about 520, at least about 530, at least about 540, at least about 550, at least about 560, at least about 670, at least about 580, at least about 590, at least about 600, at least about 610, at least about 620, at least about 630, at least about 640, at least about 650, at least about 660, at least about 670, at least about 680, at least about 690, at least about 700, at least about 710, at least about 720, at least about 730, at least about 740, at least about 750, at least about 760, at least about 770, at least about 780, at least about 790, at least about 800, at least about 810, at least about 820, at least about 830, at least about 840, at least about 850, at least about 860, at least about 870, at least about 880, at least about 890, at least about 900, at least about 910, at least about 920, at least about 930, at least about 940, at least about 950, at least about 960, at least about 970, at least about 980, at least about 990, or about 1000.

In some aspects, n is between about 50 and about 100, between about 100 and about 150, between about 150 and about 200, between about 200 and about 250, between about 250 and about 300, between about 300 and about 350, between about 350 and about 400, between about 400 and about 450, between about 450 and about 500, between about 500 and about 550, between about 550 and about 600, between about 600 and about 650, between about 650 and about 700, between about 700 and about 750, between about 750 and about 800, between about 800 and about 850, between about 850 and about 900, between about 900 and about 950, or between about 950 and about 1000.

In some aspects, n is at least about 80, at least about 81, at least about 82, at least about 83, at least about 84, at least about 85, at least about 86, at least about 87, at least about 88, at least about 89, at least about 90, at least about 91, at least about 92, at least about 93, at least about 94, at least about 95, at least about 96, at least about 97, at least about 98, at least about 99, at least about 100, at least about 101, at least about 102, at least about 103, at least about 104, at least about 105, at least about 106, at least about 107, at least about 108, at least about 109, at least 110, at least about 111, at least about 112, at least about 113, at least about 114, at least about 115, at least about 116, at least about 117, at least about 118, at least about 119, at least about 120, at least about 121, at least about 122, at least about 123, at least about 124, at least about 125, at least about 126, at least about 127, at least about 128, at least about 129, at least about 130, at least about 131, at least about 132, at least about 133, at least about 134, at least about 135, at least about 136, at least about 137, at least about 138, at least about 139, at least about 140, at least about 141, at least about 142, at least about 143, at least about 144, at least about 145, at least about 146, at least about 147, at least about 148, at least about 149, at least about 150, at least about 151, at least about 152, at least about 153, at least about 154, at least about 155, at least about 156, at least about 157, at least about 158, at least about 159, or at least about 160.

In some aspects, n is about 80 to about 90, about 90 to about 100, about 100 to about 110, about 110 to about 120, about 120 to about 130, about 130 to about 140, about 140 to about 150, about 150 to about 160, about 85 to about 95, about 95 to about 105, about 105 to about 115, about 115 to about 125, about 125 to about 135, about 135 to about 145, about 145 to about 155, about 155 to about 165, about 80 to about 100, about 100 to about 120, about 120 to about 140, about 140 to about 160, about 85 to about 105, about 105 to about 125, about 125 to about 145, about 145 to about 165.

In some aspects, n is between 2 and 10, between 10 and 20, between 20 and 30, between 30 and 40, between 40 and 50, between 50 and 60, between 60 and 70, between 70 and 80, between 80 and 90, between 90 and 100, between 100 and 110, between 110 and 120, between 120 and 130, between 130 and 140, between 140 and 150, between 150 and 160, between 160 and 170, between 170 and 180, between 180 and 190, or between 190 and 200. In some specific aspects, n has a value from 3 to 200, from 3 to 20, from 10 to 30, or from 9 to 45.

In some aspects, the PEG is a branched PEG. Branched PEGs have three to ten PEG chains emanating from a central core group. In certain aspects, the PEG moiety is a monodisperse polyethylene glycol. In the context of the present disclosure, a monodisperse polyethylene glycol (mdPEG) is a PEG that has a single, defined chain length and molecular weight. mdPEGs are typically generated by separation from the polymerization mixture by chromatography. In certain formulae, a monodisperse PEG moiety is assigned the abbreviation mdPEG. In some aspects, the PEG is a Star PEG. Star PEGs have 10 to 100 PEG chains emanating from a central core group. In some aspects, the PEG is a Comb PEGs. Comb PEGs have multiple PEG chains normally grafted onto a polymer backbone.

In certain aspects, the PEG has a molar mass between 100 g/mol and 3000 g/mol, particularly between 100 g/mol and 2500 g/mol, more particularly of approx. 100 g/mol to 2000 g/mol. In certain aspects, the PEG has a molar mass between 200 g/mol and 3000 g/mol, particularly between 300 g/mol and 2500 g/mol, more particularly of approx. 400 g/mol to 2000 g/mol. In certain aspects, the PEG has a molar mass between about 1000 g/mol and about 2000 g/mol, between about 2000 g/mol and about 3000 g/mol, between about 3000 g/mol to about 4000 g/mol, between about 4000 g/mol and about 5000 g/mol, between about 5000 g/mol and about 6000 g/mol, between about 6000 g/mol and about 7000 g/mol, or between 7000 g/mol and about 8000 g/mol.

In some aspects, the PEG is $PEG_{100}$, $PEG_{200}$, $PEG_{300}$, $PEG_{400}$, $PEG_{500}$, $PEG_{600}$, $PEG_{700}$, $PEG_{800}$, $PEG_{900}$, $PEG_{1000}$, $PEG_{1100}$, $PEG_{1200}$, $PEG_{1300}$, $PEG_{1400}$, $PEG_{1500}$, $PEG_{1600}$, $PEG_{1700}$, $PEG_{1800}$, $PEG_{1900}$, $PEG_{2000}$, $PEG_{2100}$, $PEG_{2200}$, $PEG_{2300}$, $PEG_{2400}$, $PEG_{2500}$, $PEG_{1600}$, $PEG_{1700}$, $PEG_{1800}$, $PEG_{1900}$, $PEG_{2000}$, $PEG_{2100}$, $PEG_{2200}$, $PEG_{2300}$, $PEG_{2400}$, $PEG_{2500}$, $PEG_{2600}$, $PEG_{2700}$, $PEG_{2800}$, $PEG_{2900}$, or $PEG_{3000}$ $PEG_{2100}$, $PEG_{2200}$, $PEG_{2300}$, $PEG_{2400}$, $PEG_{2500}$, $PEG_{2600}$, $PEG_{2700}$, $PEG_{2800}$, $PEG_{2900}$, $PEG_{3000}$, $PEG_{3100}$, $PEG_{3200}$, $PEG_{3300}$, $PEG_{3400}$, $PEG_{3500}$, $PEG_{3600}$, $PEG_{3700}$, $PEG_{3800}$, $PEG_{3900}$, $PEG_{4000}$, $PEG_{4100}$, $PEG_{4200}$, $PEG_{4300}$, $PEG_{4400}$, $PEG_{4500}$, $PEG_{4600}$, $PEG_{4700}$, $PEG_{4800}$, $PEG_{4900}$, $PEG_{5000}$, $PEG_{5100}$, $PEG_{5200}$, $PEG_{5300}$, $PEG_{5400}$, $PEG_{5500}$, $PEG_{5600}$, $PEG_{5700}$, $PEG_{5800}$, $PEG_{5900}$, $PEG_{6000}$, $PEG_{6100}$, $PEG_{6200}$, $PEG_{6300}$, $PEG_{6400}$, $PEG_{6500}$, $PEG_{6600}$, $PEG_{6700}$, $PEG_{6800}$, $PEG_{6900}$, $PEG_{7000}$, $PEG_{7100}$, $PEG_{7200}$, $PEG_{7300}$, $PEG_{7400}$, $PEG_{7500}$, $PEG_{7600}$, $PEG_{7700}$, $PEG_{7800}$, $PEG_{7900}$, or $PEG_{8000}$.

In some aspects, the PEG is monodisperse, e.g., $mPEG_{100}$, $mPEG_{200}$, $mPEG_{300}$, $mPEG_{400}$, $mPEG_{500}$, $mPEG_{600}$, $mPEG_{700}$, $mPEG_{800}$, $mPEG_{900}$, $mPEG_{1000}$, $mPEG_{1100}$, $mPEG_{1200}$, $mPEG_{1300}$, $mPEG_{1400}$, $mPEG_{1500}$, $mPEG_{1600}$, $mPEG_{1700}$, $mPEG_{1800}$, $mPEG_{1900}$, $mPEG_{2000}$, $mPEG_{2100}$, $mPEG_{2200}$, $mPEG_{2300}$, $mPEG_{2400}$, $mPEG_{2500}$, $mPEG_{1600}$, $mPEG_{1700}$, $mPEG_{1800}$, $mPEG_{1900}$, $mPEG_{2000}$, $mPEG_{2100}$, $mPEG_{2200}$, $mPEG_{2300}$, $mPEG_{2400}$, $mPEG_{2500}$, $mPEG_{2600}$, $mPEG_{2700}$, $mPEG_{2800}$, $mPEG_{2900}$, $mPEG_{3000}$, $mPEG_{3100}$, $mPEG_{3200}$, $mPEG_{3300}$, $mPEG_{3400}$, $mPEG_{3500}$, $mPEG_{3600}$, $mPEG_{3700}$, $mPEG_{3800}$, $mPEG_{3900}$, $mPEG_{4000}$, $mPEG_{4100}$, $mPEG_{4200}$, $mPEG_{4300}$, $mPEG_{4400}$, $mPEG_{4500}$, $mPEG_{4600}$, $mPEG_{4700}$, $mPEG_{4800}$, $mPEG_{4900}$, $mPEG_{5000}$, $mPEG_{5100}$, $mPEG_{5200}$, $mPEG_{5300}$, $mPEG_{5400}$, $mPEG_{5500}$, $mPEG_{5600}$, $mPEG_{5700}$, $mPEG_{5800}$, $mPEG_{5900}$, $mPEG_{6000}$, $mPEG_{6100}$, $mPEG_{6200}$, $mPEG_{6300}$, $mPEG_{6400}$, $mPEG_{6500}$, $mPEG_{6600}$, $mPEG_{6700}$, $mPEG_{6800}$, $mPEG_{6900}$, $mPEG_{7000}$, $mPEG_{7100}$, $mPEG_{7200}$, $mPEG_{7300}$, $mPEG_{7400}$, $mPEG_{7500}$, $mPEG_{7600}$, $mPEG_{7700}$, m $PEG_{7800}$, $mPEG_{7900}$, or $mPEG_{8000}$.

In some aspects, the analyte (e.g., a protein such as an antibody) comprises a single PEG. In some aspects, the analyte (e.g., a protein such as an antibody) can comprise more than one PEG, wherein all the PEGs are the same or at least one is different from the other PEGs. In some aspects, the PEG is a linear PEG. In some aspects, the PEG is a linear methoxy PEG. In some aspects, the PEG has a molecular mass of approximately 30 kDa. In some aspects, the PEG (e.g., a linear methoxy PEG) is attached to the protein (e.g., an antibody) by chemical or enzymatic conjugation. In some aspects, the conjugation is via an unnatural amino acid.

In some aspects, the polyglycerol (PG) is described by the formula $((R_3-O-(CH_2-CHOH-CH_2O)_n-)$ with $R_3$ being hydrogen, methyl or ethyl, and n having a value from 3 to 200. In some aspects, n has a value from 3 to 20. In some aspects, n has a value from 10 to 30. In some alternatives of these aspects, n has a value from 9 to 45. In some aspects, the PG is a branched polyglycerol described by the formula $(R_3-O-(CH_2-CHOR_5-CH_2-O)_n)$ with $R_5$ being hydrogen or a linear glycerol chain described by the formula (R₃—O—(CH₂—CHOH—CH₂—O)ₙ—) and R₃ being hydrogen, methyl or ethyl.

In some aspects, the PG is a hyperbranched polyglycerol described by the formula (R₃—O—(CH₂—CHOR₅—CH₂—O)ₙ) with R₅ being hydrogen or a glycerol chain described by the formula (R₃—O—(CH₂—CHOR₆—CH₂—O)ₙ—), with R₆ being hydrogen or a glycerol chain described by the formula (R₃—O—(CH₂—CHOR₇—CH₂—O)ₙ—), with R₇ being hydrogen or a linear glycerol chain described by the formula (R₃—O—(CH₂—CHOH—CH₂—O)ₙ—) and R₃ being hydrogen, methyl or ethyl. Hyperbranched glycerol and methods for its synthesis are described in Oudshorn et al. (2006) Biomaterials 27:5471-5479; Wilms et al. (20100 Acc. Chem. Res. 43, 129-41, and references cited therein.

In certain aspects, the PG has a molar mass between 100 g/mol and 3000 g/mol, particularly between 100 g/mol and 2500 g/mol, more particularly of approx. 100 g/mol to 2000 g/mol. In certain aspects, the PG has a molar mass between 200 g/mol and 3000 g/mol, particularly between 300 g/mol and 2500 g/mol, more particularly of approx. 400 g/mol to 2000 g/mol. In certain aspects, the PG has a molar mass between about 1000 g/mol and about 2000 g/mol, between about 2000 g/mol and about 3000 g/mol, between about 3000 g/mol to about 4000 g/mol, between about 4000 g/mol and about 5000 g/mol, between about 5000 g/mol and about 6000 g/mol, between about 6000 g/mol and about 7000 g/mol, or between 7000 g/mol and about 8000 g/mol.

In some aspects, the PG is $PG_{100}$, $PG_{200}$, $PG_{300}$, $PG_{400}$, $PG_{500}$, $PG_{600}$, $PG_{700}$, $PG_{800}$, $PG_{900}$, $PG_{1000}$, $PG_{100}$, $PG_{1200}$, $PG_{1300}$, $PG_{1400}$, $PG_{1500}$, $PG_{1600}$, $PG_{1700}$, $PG_{1800}$, $PG_{1900}$, $PG_{2000}$, $PG_{2100}$, $PG_{2200}$, $PG_{2300}$, $PG_{2400}$, $PG_{2500}$, $PG_{1600}$, $PG_{1700}$, $PG_{1800}$, $PG_{1900}$, $PG_{2000}$, $PG_{2100}$, $PG_{2200}$, $PG_{2300}$, $PG_{2400}$, $PG_{2500}$, $PG_{2600}$, $PG_{2700}$, $PG_{2800}$, $PG_{2900}$, $PG_{3000}$, $PG_{3100}$, $PG_{3200}$, $PG_{3300}$, $PG_{3400}$, $PG_{3500}$, $PG_{3600}$, $PG_{3700}$, $PG_{3800}$, $PG_{3900}$, $PG_{4000}$, $PG_{4100}$, $PG_{4200}$, $PG_{4300}$, $PG_{4400}$, $PG_{4500}$, $PG_{4600}$, $PG_{4700}$, $PG_{4800}$, $PG_{4900}$, $PG_{5000}$, $PG_{5100}$, $PG_{5200}$, $PG_{5300}$, $PG_{5400}$, $PG_{5500}$, $PG_{5600}$, $PG_{5700}$, $PG_{5800}$, $PG_{5900}$, $PG_{6000}$, $PG_{6100}$, $PG_{6200}$, $PG_{6300}$, $PG_{6400}$, $PG_{6500}$, $PG_{6600}$, $PG_{6700}$, $PG_{6800}$, $PG_{6900}$, $PG_{7000}$, $PG_{7100}$, $PG_{7200}$, $PG_{7300}$, $PG_{7400}$, $PG_{7500}$, $PG_{7600}$, $PG_{7700}$, $PG_{7800}$, $PG_{7900}$, or $PG_{8000}$.

In some aspects, the PG is monodisperse, e.g., $mPG_{100}$, $mPG_{200}$, $mPG_{300}$, $mPG_{400}$, $mPG_{500}$, $mPG_{600}$, $mPG_{700}$, $mPG_{800}$, $mPG_{900}$, $mPG_{1000}$, $mPG_{1100}$, $mPG_{1200}$, $mPG_{1300}$, $mPG_{1400}$, $mPG_{1500}$, $mPG_{1600}$, $mPG_{1700}$, $mPG_{1800}$, $mPG_{1900}$, $mPG_{2000}$, $mPG_{2100}$, $mPG_{2200}$, $mPG_{2300}$, $mPG_{2400}$, $mPG_{2500}$, $mPG_{1600}$, $mPG_{1700}$, $mPG_{1800}$, $mPG_{1900}$, $mPG_{2000}$, $mPG_{2100}$, $mPG_{2200}$, $mPG_{2300}$, $mPG_{2400}$, $mPG_{2500}$, $mPG_{2600}$, $mPG_{2700}$, $mPG_{2800}$, $mPG_{2900}$, $mPG_{3000}$, $mPG_{3100}$, $mPG_{3200}$, $mPG_{3300}$, $mPG_{3400}$, $mPG_{3500}$, $mPG_{3600}$, $mPG_{3700}$, $mPG_{3800}$, $mPG_{3900}$, $mPG_{4000}$, $mPG_{4100}$, $mPG_{4200}$, $mPG_{4300}$, $mPG_{4400}$, $mPG_{4500}$, $mPG_{4600}$, $mPG_{4700}$, $mPG_{4800}$, $mPG_{4900}$, $mPG_{5000}$, $mPG_{5100}$, $mPG_{5200}$, $mPG_{5300}$, $mPG_{5400}$, $mPG_{5500}$, $mPG_{5600}$, $mPG_{5700}$, $mPG_{5800}$, $mPG_{5900}$, $mPG_{6000}$, $mPG_{6100}$, $mPG_{6200}$, $mPG_{6300}$, $mPG_{6400}$, $mPG_{6500}$, $mPG_{6600}$, $mPG_{6700}$, $mPG_{6800}$, $mPG_{6900}$, $mPG_{7000}$, $mPG_{7100}$, $mPG_{7200}$, $mPG_{7300}$, $mPG_{7400}$, $mPG_{7500}$, $mPG_{7600}$, $mPG_{7700}$, $mPG_{7800}$, $mPG_{7900}$, or $mPG_{8000}$.

In some aspects, the water-soluble biopolymer comprises poly(propylene glycol) ("PPG"). In some aspects, PPG is characterized by the following formula, with n having a value from 1 to 1000.

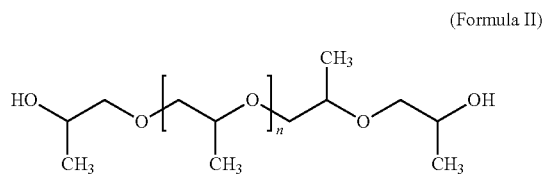

(Formula II)

In some aspects, the n of the PPG has a value of 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, 160, 161, 162, 163, 164, 165, 166, 167, 168, 169, 170, 171, 172, 173, 174, 175, 176, 177, 178, 179, 189, 181, 182, 183, 184, 185, 186, 187, 188, 189, 190, 191, 192, 193, 194, 195, 196, 197, 198, 199, or 200.

In some aspects, n of the PPG is at least about 10, at least about 20, at least about 30, at least about 40, at least about 50, at least about 60, at least about 70, at least about 80, at least about 90, at least about 100, at least about 110, at least about 120, at least about 130, at least about 140, at least about 150, at least about 160, at least about 170, at least about 180, at least about 190, at least about 200, at least about 210, at least about 220, at least about 230, at least about 240, at least about 250, at least about 260, at least about 270, at least about 280, at least about 290, at least about 300, at least about 310, at least about 320, at least about 330, at least about 340, at least about 350, at least about 360, at least about 370, at least about 380, at least about 390, at least about 400, at least about 410, at least about 420, at least about 430, at least about 440, at least about 450, at least about 460, at least about 470, at least about 480, at least about 490, at least about 500, at least about 510, at least about 520, at least about 530, at least about 540, at least about 550, at least about 560, at least about 670, at least about 580, at least about 590, at least about 600, at least about 610, at least about 620, at least about 630, at least about 640, at least about 650, at least about 660, at least about 670, at least about 680, at least about 690, at least about 700, at least about 710, at least about 720, at least about 730, at least about 740, at least about 750, at least about 760, at least about 770, at least about 780, at least about 790, at least about 800, at least about 810, at least about 820, at least about 830, at least about 840, at least about 850, at least about 860, at least about 870, at least about 880, at least about 890, at least about 900, at least about 910, at least about 920, at least about 930, at least about 940, at least about 950, at least about 960, at least about 970, at least about 980, at least about 990, or about 1000.

In some aspects, the n of the PPG is between about 50 and about 100, between about 100 and about 150, between about 150 and about 200, between about 200 and about 250, between about 250 and about 300, between about 300 and about 350, between about 350 and about 400, between about 400 and about 450, between about 450 and about 500, between about 500 and about 550, between about 550 and about 600, between about 600 and about 650, between about 650 and about 700, between about 700 and about 750, between about 750 and about 800, between about 800 and about 850, between about 850 and about 900, between about 900 and about 950, or between about 950 and about 1000.

In some aspects, the n of the PPG is at least about 80, at least about 81, at least about 82, at least about 83, at least about 84, at least about 85, at least about 86, at least about 87, at least about 88, at least about 89, at least about 90, at least about 91, at least about 92, at least about 93, at least about 94, at least about 95, at least about 96, at least about 97, at least about 98, at least about 99, at least about 100, at least about 101, at least about 102, at least about 103, at least about 104, at least about 105, at least about 106, at least about 107, at least about 108, at least about 109, at least 110, at least about 111, at least about 112, at least about 113, at least about 114, at least about 115, at least about 116, at least about 117, at least about 118, at least about 119, at least about 120, at least about 121, at least about 122, at least about 123, at least about 124, at least about 125, at least about 126, at least about 127, at least about 128, at least about 129, at least about 130, at least about 131, at least about 132, at least about 133, at least about 134, at least about 135, at least about 136, at least about 137, at least about 138, at least about 139, at least about 140, at least about 141, at least about 142, at least about 143, at least about 144, at least about 145, at least about 146, at least about 147, at least about 148, at least about 149, at least about 150, at least about 151, at least about 152, at least about 153, at least about 154, at least about 155, at least about 156, at least about 157, at least about 158, at least about 159, or at least about 160.

In some aspects, the n of the PPG is about 80 to about 90, about 90 to about 100, about 100 to about 110, about 110 to about 120, about 120 to about 130, about 130 to about 140, about 140 to about 150, about 150 to about 160, about 85 to about 95, about 95 to about 105, about 105 to about 115, about 115 to about 125, about 125 to about 135, about 135 to about 145, about 145 to about 155, about 155 to about 165, about 80 to about 100, about 100 to about 120, about 120 to about 140, about 140 to about 160, about 85 to about 105, about 105 to about 125, about 125 to about 145, or about 145 to about 165.

Thus, is some aspects, the PPG is a branched PPG. Branched PPGs have three to ten PPG chains emanating from a central core group. In certain aspects, the PPG moiety is a monodisperse polyethylene glycol. In the context of the present disclosure, a monodisperse polyethylene glycol (mdPPG) is a PPG that has a single, defined chain length and molecular weight. mdPEGs are typically generated by separation from the polymerization mixture by chromatography. In certain formulae, a monodisperse PPG moiety is assigned the abbreviation mdPPG.

In some aspects, the PPG is a Star PPG. Star PPGs have 10 to 100 PPG chains emanating from a central core group. In some aspects, the PPG is a Comb PPGs. Comb PPGs have multiple PPG chains normally grafted onto a polymer backbone.

In certain aspects, the PPG has a molar mass between about 1000 g/mol and about 2000 g/mol, between about 2000 g/mol and about 3000 g/mol, between about 3000 g/mol to about 4000 g/mol, between about 4000 g/mol and about 5000 g/mol, between about 5000 g/mol and about 6000 g/mol, between about 6000 g/mol and about 7000 g/mol, or between about 7000 g/mol and about 8000 g/mol.

In some aspects, the PPG is $PPG_{100}$, $PPG_{200}$, $PPG_{300}$, $PPG_{400}$, $PPG_{500}$, $PPG_{600}$, $PPG_{700}$, $PPG_{800}$, $PPG_{900}$, $PPG_{1000}$, $PPG_{1100}$, $PPG_{1200}$, $PPG_{1300}$, $PPG_{1400}$, $PPG_{1500}$, $PPG_{1600}$, $PPG_{1700}$, $PPG_{1800}$, $PPG_{1900}$, $PPG_{2000}$, $PPG_{2100}$, $PPG_{2200}$, $PPG_{2300}$, $PPG_{2400}$, $PPG_{2500}$, $PPG_{1600}$, $PPG_{1700}$, $PPG_{1800}$, $PPG_{1900}$, $PPG_{2000}$, $PPG_{2100}$, $PPG_{2200}$, $PPG_{2300}$, $PPG_{2400}$, $PPG_{2500}$, $PPG_{2600}$, $PPG_{2700}$, $PPG_{2800}$, $PPG_{2900}$, $PPG_{3000}$, $PPG_{3100}$, $PPG_{3200}$, $PPG_{3300}$, $PPG_{3400}$, $PPG_{3500}$, $PPG_{3600}$, $PPG_{3700}$, $PPG_{3800}$, $PPG_{3900}$, $PPG_{4000}$, $PPG_{4100}$, $PPG_{4200}$, $PPG_{4300}$, $PPG_{4400}$, $PPG_{4500}$, $PPG_{4600}$, $PPG_{4700}$, $PPG_{4800}$, $PPG_{4900}$, $PPG_{5000}$, $PPG_{5100}$, $PPG_{5200}$, $PPG_{5300}$, $PPG_{5400}$, $PPG_{5500}$, $PPG_{5600}$, $PPG_{5700}$, $PPG_{5800}$, $PPG_{5900}$, $PPG_{6000}$, $PPG_{6100}$, $PPG_{6200}$, $PPG_{6300}$, $PPG_{6400}$, $PPG_{6500}$, $PPG_{6600}$, $PPG_{6700}$, $PPG_{6800}$, $PPG_{6900}$, $PPG_{7000}$, $PPG_{7100}$, $PPG_{7200}$, $PPG_{7300}$, $PPG_{7400}$, $PPG_{7500}$, $PPG_{7600}$, $PPG_{7700}$, $PPG_{7800}$, $PPG_{7900}$, or $PPG_{8000}$. In some aspects, the PPG is $PPG_{5000}$. In some aspects, the PPG is $PPG_{6000}$. In some aspects, the PPG is $PPG_{4000}$.

In some aspects, the PPG is monodisperse, e.g., $mPPG_{100}$, $mPPG_{200}$, $mPPG_{300}$, $mPPG_{400}$, $mPPG_{500}$, $mPPG_{600}$, $mPPG_{700}$, $mPPG_{800}$, $mPPG_{900}$, $mPPG_{1000}$, $mPPG_{1100}$, $mPPG_{1200}$, $mPPG_{1300}$, $mPPG_{1400}$, $mPPG_{1500}$, $mPPG_{1600}$, $mPPG_{1700}$, $mPPG_{1800}$, $mPPG_{1900}$, $mPPG_{2000}$, $mPPG_{2100}$, $mPPG_{2200}$, $mPPG_{2300}$, $mPPG_{2400}$, $mPPG_{2500}$, $mPPG_{1600}$, $mPPG_{1700}$, $mPPG_{1800}$, $mPPG_{1900}$, $mPPG_{2000}$, $mPPG_{2100}$, $mPPG_{2200}$, $mPPG_{2300}$, $mPPG_{2400}$, $mPPG_{2500}$, $mPPG_{2600}$, $mPPG_{2700}$, $mPPG_{2800}$, $mPPG_{2900}$, $mPPG_{3000}$, $mPPG_{3100}$, $mPPG_{3200}$, $mPPG_{3300}$, $mPPG_{3400}$, $mPPG_{3500}$, $mPPG_{3600}$, $mPPG_{3700}$, $mPPG_{3800}$, $mPPG_{3900}$, $mPPG_{4000}$, $mPPG_{4100}$, $mPPG_{4200}$, $mPPG_{4300}$, $mPPG_{4400}$, $mPPG_{4500}$, $mPPG_{4600}$, $mPPG_{4700}$, $mPPG_{4800}$, $mPPG_{4900}$, $mPPG_{5000}$, $mPPG_{5100}$, $mPPG_{5200}$, $mPPG_{5300}$, $mPPG_{5400}$, $mPPG_{5500}$, $mPPG_{5600}$, $mPPG_{5700}$, $mPPG_{5800}$, $mPPG_{5900}$, $mPPG_{6000}$, $mPPG_{6100}$, $mPPG_{6200}$, $mPPG_{6300}$, $mPPG_{6400}$, $mPPG_{6500}$, $mPPG_{6600}$, $mPPG_{6700}$, $mPPG_{6800}$, $mPPG_{6900}$, $mPPG_{7000}$, $mPPG_{7100}$, $mPPG_{7200}$, $mPPG_{7300}$, $mPPG_{7400}$, $mPPG_{7500}$, $mPPG_{7600}$, $mPPG_{7700}$, $m PPG_{7800}$, $mPPG_{7900}$, or $mPPG_{8000}$.

The amount of analyte (e.g., PEGylated protein) used within an icIEF sample can vary, and depends in part on the size of the capillary used. In generally, the icIEF capillary is loaded with about 0.1 mg to about 5 mg of total protein. In some aspects, the amount of protein analyte in a composition disclosed herein (e.g., a mixture comprising an icIEF sample matrix of the present disclosure and a PEGylated protein) is between about 0.1 mg to about 5 mg of total protein, e.g., about 0.1 mg, about 0.2 mg, about 0.3 mg, about 0.4 mg, about 0.5 mg, about 0.6 mg, about 0.7 mg, about 0.8 mg, about 0.9 mg, about 1 mg, about 1.5 mg, about 2 mg, about 2.5 mg, about 3 mg, about 3.5 mg, about 4 mg, about 4.5 mg, or about 5 mg.

In some aspects, the PEGylated protein is a PEGylated protein composition comprising a plurality of charge variants. Thus, in some aspects, the PEGylated protein is a population of species comprising a main or dominants species are other species which differ from the dominant species with respect their respective charges. Accordingly, the PEGylated protein composition can contain charge variant species that are more acidic or that are more basic than the main or dominant species.

In some aspects, the analyte, e.g., a PEGylated protein, is at a concentration between about 0.1 mg/mL and about 1 mg/mL. In some aspects, the analyte, e.g., a PEGylated protein, is at a concentration between about 0.25 mg/mL to about 0.75 mg/mL. In some aspects, the analyte, e.g., a PEGylated protein, is at a concentration of about 0.5 mg/mL. In some aspects, the analyte, e.g., a PEGylated protein, is at a concentration of about 0.1 mg/mL, about 0.2 mg/mL, about 0.3 mg/mL, about 0.4 mg/mL, about 0.5 mg/mL, about 0.6 mg/mL, about 0.7 mg/mL, about 0.8 mg/mL, about 0.9 mg/mL, or about 1 mg/mL.

In some aspects, the present disclosure provides kits for icIEF sample matrices. In some aspects, the kit comprises an icIEF sample matrix disclosed here. In some aspects, the kit comprises an ampholyte, glycine ad/or taurine, and optionally instructions for use according to the methods disclosed herein. In some aspects, the ampholyte, glycine and/or taurine can be in the same vial or in different vials. In some aspects, the kit can comprise one or more components in dry form and over or more vials comprising a solvent for reconstitution.

The present disclosure also provides method of measuring the isoelectric point (pI) of an analyte comprising a water soluble polymer, e.g., PEG, such as a PEGylated protein comprising subjecting a sample comprising an icIEF sample matrix disclosed herein and the PEGylated protein to icIEF.

Also provided is a method of measuring the isoelectric points (pI) of a population of charge variants of an analyte, wherein the analyte contains a water soluble polymer, e.g., PEG, such as a PEGylated protein composition, wherein the method comprises subjecting a sample comprising (i) an icIEF sample matrix disclosed herein; and (ii) the analyte comprising a population of charge variants to icIEF.

Also provided is a method of separating a population of charge variants of an analyte containing a water soluble polymer, e.g., PEG, such as a PEGylated protein composition, according to their respective isoelectric points (pI), wherein the method comprises subjecting a sample comprising (i) an icIEF sample matrix disclosed herein and (ii) the analyte comprising a population of charge variants to icIEF.

As disclosed above, in some aspects, the analyte, e.g., a PEGylated protein composition obtained after PEGylating a recombinant protein, comprises multiple charge variants species, e.g., species that are more acidic or more basic species with respect to the dominant (main species) in the composition. In some aspects of the methods disclosed herein, the analyte concentration (e.g., total protein concentration in a PEGylated protein composition comprising multiple charge variant species) is between about 0.1 mg/mL and about 1 mg/mL. In some aspects, the analyte concentration (e.g., PEGylated protein or PEGylated protein composition) is between about 0.25 mg/mL and about 0.75 mg/mL. In some aspects, the analyte concentration (e.g., PEGylated protein or PEGylated protein composition) is about 0.1 mg/mL, about 0.2 mg/mL, about 0.3 mg/mL, about 0.4 mg/mL, about 0.5 mg/mL, about 0.6 mg/mL, about 0.7 mg/mL, about 0.8 mg/mL, about 0.9 mg/mL, or about 1 mg/mL. In some aspects, the analyte is a PEGylated protein is at a concentration of about 0.5 mg/mL.

In some aspects of the methods disclosed herein, the icIEF comprises (i) applying a first voltage for a first predetermined period of time such that the carrier ampholyte forms a pH gradient within the capillary; and (ii) applying a second voltage for a second predetermined period of time to focus the migration of charge variants of the protein within the capillary such that the overall charge of the variants is neutral.

In some aspects of the methods disclosed herein, the first voltage is between about 1V and about 3000V. For example, the first voltage can be about 1 V, about 100 V, about 250 V, about 500 V, about 750 V, about 1000 V, about 1250 V, about 1500 V, about 1750 V, about 2000 V, about 2250 V, about 2500 V, about 2750 V, or about 3000 V. In some aspects, the first voltage is between about 1 V and about 100 V, between about 100 V and about 200 V, between about 200 V and about 300 V, between about 300 V and about 400 V, between about 400 V and about 500 V, between about 500 V and about 600 V, between about 600 V and about 700 V, between about 700 V and about 800 V, between about 800 V and about 900 V, between about 900 V and about 1000 V, between about 1000 V and about 1100 V, between about 1100 V and about 1200 V, between about 1200 V and about 1300 V, between about 1300 V and about 1400 V, between about 1400 V and about 1500 V, between about 1500 V and about 1600 V, between about 1600 V and about 1700 V, between about 1700 V and about 1800 V, between about 1800 V and about 1900 V, between about 1900 V and about 2000 V, between about 2000 V and about 2100 V, between about 2100 V and about 2200 V, between about 2200 V and about 2300 V, between about 2300 V and about 2400 V, between about 2400 V and about 2500 V, between about 2500 V and about 2600 V, between about 2600 V and about 2700 V, between about 2700 V and about 2800 V, between about 2800 V and about 2900 V, or between about 2900 and about 3000 V.

In some aspects of the methods disclosed herein, the first voltage is between about 100V and about 2900V, between about 200 V and about 2800 V, between about 300 V and about 2700 V, between about 400 V and about 2600 V, between about 500 V and about 2500 V, between about 600 V and about 2400 V, between about 700 V and about 2300 V, between about 800 V and about 2200 V, between about 900 V and about 2100 V, between about 1000 V and about 2000 V, between about 1100 V and about 1900 V, between about 1200 V and about 1800 V, between about 1300 V and about 1700 V, or between about 1400 V and about 1600 V. In some particular aspects, the first voltage is about 1500V.

In some aspects of the methods disclosed herein, the second voltage is between about 1V and about 6000V. For example, the second voltage can be about 1 V, about 100 V, about 250 V, about 500 V, about 750 V, about 1000 V, about 1250 V, about 1500 V, about 1750 V, about 2000 V, about 2250 V, about 2500 V, about 2750, about 3000 V, about 3250 V, about 3500 V, about 3750 V, about 4000 V, about 4250 V, about 4500 V, about 4750 V, about 5000 V, about 5250 V, about 5500 V, about 5750 V, or about 6000 V.

In some aspects of the methods disclosed herein, the second voltage is between about 1 V and about 100 V, between about 100 V and about 200 V, between about 200 V and about 300 V, between about 300 V and about 400 V, between about 400 V and about 500 V, between about 500 V and about 600 V, between about 600 V and about 700 V, between about 700 V and about 800 V, between about 800 V and about 900 V, between about 900 V and about 1000 V, between about 1000 V and about 1100 V, between about 1100 V and about 1200 V, between about 1200 V and about 1300 V, between about 1300 V and about 1400 V, between about 1400 V and about 1500 V, between about 1500 V and about 1600 V, between about 1600 V and about 1700 V, between about 1700 V and about 1800 V, between about 1800 V and about 1900 V, between about 1900 V and about 2000 V, between about 2000 V and about 2100 V, between about 2100 V and about 2200 V, between about 2200 V and about 2300 V, between about 2300 V and about 2400 V, between about 2400 V and about 2500 V, between about 2500 V and about 2600 V, between about 2600 V and about 2700 V, between about 2700 V and about 2800 V, between about 2800 V and about 2900 V, between about 2900 V and about 3000 V, between about 3100 V and about 3200 V, between about 3200 V and a 3300 V, between about 3300 V and about 3400 V, between about 3400 V and about 3500 V, between about 3500 V and about 3600 V, between about 3600 V and about 3700 V, between about 3700 V and about 3800 V, between about 3800 V and about 3900 V, between about 3900 V and about 4000 V, between about 4000 V and about 4100 V, between about 4100 V and about 4200 V, between about 4200 V and about 4300 V, between about 4300 V and about 4400 V, between about 4400 V and about 4500 V, between about 4500 V and about 4600 V, between about 4600 V and about 4700 V, between about 4700 V and about 4800 V, between about 4800 V and about 4900, about 4900 V and about 5000 V, between about 5000 V and about 5100 V, between about 5100 V and 5200 V, between about 5200 V and about 5300 V, between about 5300 V and about 5400 V, between about 5400 V and about 5500 V, between about 5500 V and about 5600 V, between about 5600 V and about 5700 V, between about 5700 V and about 5800 V, between about 5800 V and about 5900 V, or about 5900 V and about 6000 V.

In some aspects of the methods disclosed herein, the second voltage is between about 100V and about 5900V, between about 200 V and about 5800 V, between about 300 V and 5700 V, between about 400 V and about 5600 V, between about 500 V and about 5500 V, between about 600 V and about 5400 V, between about 700 V and about 5300 V, between about 800 V and about 5200 V, between about 900 V and about 5100 V, between about 1000 V and about 5000 V, between about 1100 V and about 4900 V, between about 1200 V and about 4800 V, between about 1300 V and about 4700 V, between about 1400 V and about 4600 V, between about 1500 V and about 4500 V, between about 1600 V and about 4400 V, between about 1700 V and about 4300 V, between about 1800 V and about 4200 V, between about 1900 V and about 4100 V, between about 2000 V and about 4000 V, between about 2100 V and about 3900 V, between about 2200 V and about 3800 V, between about 2300 V and about 3700 V, between about 2400 V and about 3600 V, between about 2500 V and about 3500 V, between about 2600 V and about 3400 V, between about 2700 V and about 3300 V, between about 2800 V and about 3200 V, or between about 2900 V and about 3100 V. In some particular aspects, the second voltage is about 3000V.

In some aspects of the methods disclosed herein, the first predetermined period of time is between about 1 second and about 5 minutes. For example, the first predetermined period of time can be about 1 second, about 10 seconds, about 20 seconds, about 30 seconds, about 40 seconds, about 50 seconds, about 1 minute (60 seconds), about 1.5 minutes (90 seconds), about 2 minutes (120 seconds), about 2.5 minutes (150 seconds), about 3 minutes (180 seconds), about 3.5 minutes (210 seconds), about 4 minutes (240 seconds), about 4.5 minutes (270 seconds), or about 5 minutes (300 seconds). In some aspects of the methods disclosed herein, the first predetermined period of time is between about 10 seconds and about 20 seconds, between about 20 seconds and about 30 seconds, between about 30 seconds and about 40 seconds, between about 40 seconds and about 50 seconds, between about 50 seconds about 60 seconds, between about 60 seconds and about 70 seconds, between about 70 seconds and about 80 seconds, between about 80 seconds and about 90 seconds, between about 90 seconds and about 100 seconds, between about 100 seconds and about 110 seconds, or between about 110 seconds and about 120 seconds. In some aspects of the methods disclosed herein, the first predetermined period of time is between 10 seconds and 110 seconds, between about 20 seconds and about 100 seconds, between about 30 seconds and about 90 seconds, between about 40 seconds about and about 80 seconds, or between about 50 second and about 70 seconds. In some particular aspects, the first predetermined period of time is about 60 seconds (1 minute).

In some aspects of the methods disclosed herein, the second predetermined period of time is between about 1 minute and about 15 minutes. For example, the second predetermined period of time can be about 1 minute, about 2 minutes, about 3 minutes, about 4 minutes, about 5 minutes, about 6 minutes, about 7 minutes, about 8 minutes, about 9 minutes, about 10 minutes, about 11 minutes, about 12 minutes, about 13 minutes, about 14 minutes, or about 15 minutes. In some aspects, the second predetermined period of time is between about 1 minute and about 2 minutes, between about 2 minutes and about 3 minutes, between about 3 minutes and about 4 minutes, between about 4 minutes and about 5 minutes, between about 5 minutes and about 6 minutes, between about 6 minutes and about 7 minutes, between about 7 minutes and about 8 minutes, between about 8 minutes and about 9 minutes, between about 9 minutes and about 10 minutes, between about 10 minutes and about 11 minutes, between about 11 minutes and about 12 minutes, between about 12 minutes and about 13 minutes, between about 13 minutes and about 14 minutes, or between about 14 minutes and about 15 minutes.

In some aspects of the methods disclosed herein, the second predetermined period of time is between about 2 minutes and about 14 minutes, between about 3 minutes and about 13 minutes, between about 4 minutes and about 12 minutes, between about 5 minutes and about 11 minutes, between about 6 minutes and about 10 minutes, between about 6 minutes and about 9 minutes, or between 7 minutes and about 9 minutes. In some specific aspects of the methods disclosed herein, the second predetermined period of time is about 8 minutes.

In some aspects of the methods disclosed herein, the first voltage is about 1500V and the first predetermined period of time is about 1 min. In some aspects, the second voltage is about 3000 V and the second predetermined period of time is about 8 minutes. In some aspects of the methods disclosed herein, (i) the first voltage is about 1500V and the first predetermined period of time is about 1 min, and (ii) the second voltage is about 3000 V and the second predetermined period of time is about 8 minutes.

In some aspects, the icIEF is conducted at approximately 10° C. In some aspects, the icIEF is conducted at a temperature between about 9° C. and about 11° C., between about 8° C. and about 12° C., between about 7° C. and about 13° C., between about 6° C. and about 14° C., or between about 5° C. and about 15° C. In some aspects, the icIEF is conducted at a temperature of about 5° C., about 6° C., about 7° C., about 8° C., about 9° C., about 10° C., about 11° C., about 12° C., about 13° C., about 14° C., or about 15° C.

The present disclosure also provides a method of enhancing the separation of a co-migrating population of charge variants of an analyte containing a water soluble polymer, e.g., PEG, such as a PEGylated protein composition, wherein the method comprises subjecting a sample comprising (i) an icIEF sample matrix disclosed herein and (ii) the analyte comprising a population of charge variants to icIEF. In some aspects, the PEGylated protein is a PEGylated antibody.

In some aspects, the method comprises using an icIEF sample matrix disclosed herein wherein the sample matrix comprises glycine, but does not comprise taurine. In some aspects, the method comprises using sample matrix comprising glycine and also taurine, wherein the taurine reduces the baseline interferences caused by the presence of glycine in the sample matrix. The co-migration of charge variants of the analyte (e.g., different charge variants of a PEGylated protein in a PEGylated protein composition) is visualized in an electropherogram as the presence of a single broad peak or several poorly resolving peaks, i.e., the peaks would be co-migrating. Accordingly, the presence of glycine in the sample matrix can enhance the separation between peaks, wherein each peak corresponds to a discrete charged variant or subpopulation of charge variants. Thus, the present disclosure provides methods of enhancing the separation of co-migrating peaks corresponding to charge variants of an analyte (e.g., different charge variants of a PEGylated protein in a PEGylated protein composition) comprising subjecting a sample comprising an icIEF sample matrix disclosed here and the analyte to icIEF, wherein the sample matrix comprises glycine. In a particular aspect, glycine is present in the sample matrix at a concentration of about 40 mM, or any other concentration disclosed above.

The enhancement of the separation between peaks (i.e., separation between charge variants) is an enhancement in icIEF resolution that can be determined quantitatively or qualitatively. For example, the enhancement in icIRF resolution due to the presence of glycine in the sample matrix can be quantitated as an increase in the number of peaks (i.e., increase in the number of charge variant species observed) in the electropherograms, an increase in separation between peaks in the electropherograms, a decrease of overlapping between peaks in the electropherograms, or any combination thereof.

The enhancement of the separation between peaks in electropherograms or in general the enhancement in icIEF resolution due to the presence of glycine in the sample matrix can be determined with respect to a reference. In some aspects, the reference is an icIEF electropherogram obtained using the same sample matrix but without glycine. In some aspects, the reference is an electropherogram obtained using a conventional sample matrix, e.g., a sample matrix using urea as additive instead of glycine.

In a particular aspect, the present disclosure provides a method of enhancing separation of co-migrating peaks of a PEGylated protein in icIEF comprising subjecting a sample comprising an icIEF sample matrix disclosed herein and the PEGylated protein to icIEF. In some aspects, the icIEF sample matrix used to enhance the separation of co-migrating peaks (or, in general, to increase icIEF resolution) comprises at least one PHARMALYTE® carrier ampholyte (e.g., PHARMALYTE® 3-10), and glycine (e.g., about 40 mM). In some aspects, the icIEF sample matrix comprises at least one PHARMALYTE® carrier ampholyte (e.g., PHARMALYTE® 3-10), glycine (e.g., about 40 mM) and taurine (e.g., about 50 mM). In some aspects, the icIEF sample matrix comprises at least one PHARMALYTE® carrier ampholyte (e.g., PHARMALYTE® 3-10), methyl cellulose, and glycine (e.g., about 40 mM). In some aspects, the icIEF sample matrix comprises at least one PHARMALYTE® carrier ampholyte (e.g., PHARMALYTE® 3-10), methyl cellulose, glycine (e.g., about 40 mM), and taurine (e.g., about 50 mM). In some aspects, the icIEF sample matrix comprises about 4% (v:v) PHARMALYTE® 3-10, about 0.35% (w:v) methyl cellulose, and about 40 mM glycine. In some aspects, the icIEF sample matrix comprises about 4% (v:v) PHARMALYTE® 3-10, about 0.35% (w:v) methyl cellulose, about 40 mM glycine and about 50 mM taurine.

The present disclosure also provides methods of reducing matrix induced baseline interference comprising using an icIEF sample matrix disclosed herein during icIEF, wherein the icIEF sample matrix comprises taurine. In some aspects, the interference is basic region interference, i.e., interference (e.g., a wavy baseline) in the basic region of an icIEF electropherogram. In some aspects, the interference can be caused by the presence of an additive in the sample matrix, e.g., cause by the presence of glycine.

In some aspects, the reduction in baseline interference can be determined by comparison of the baseline in icIEF an electropherogram obtained using an icIEF sample matrix comprising an interfering agent, e.g., glycine, and taurine, to the baseline observed in a reference icIEF electropherogram comprising the same sample matrix (i.e., comprising the interfering agent, e.g., glycine) but without taurine (i.e., a reference sample matrix). In some aspects, the reference sample matrix without taurine is a urea containing matrix. In some aspects, the reference sample matrix is a sample matrix that does not contain glycine and/or taurine.

The reduction of the baseline interference can be determined quantitatively or qualitatively. For example, the reduction of baseline interference can be measured as the decrease in the number of waves or perturbations in the baseline or a decrease in their amplitude. In general, reduction in baseline interference results in an increase in baseline linearity.

In some aspects, the icIEF sample matrix used to reduce matrix induced baseline interference comprises at least one PHARMALYTE® carrier ampholyte (e.g., PHARMALYTE® 3-10) and taurine (e.g., about 50 mM). In some aspects, the icIEF sample matrix comprises at least one PHARMALYTE® carrier ampholyte (e.g., PHARMALYTE® 3-10), glycine (e.g., about 40 mM) and taurine (e.g., about 50 mM). In some aspects, the icIEF sample matrix comprises at least one PHARMALYTE® carrier ampholyte (e.g., PHARMALYTE® 3-10), methyl cellulose, and taurine (e.g., about 50 mM). In some aspects, the icIEF sample matrix comprises at least one PHARMALYTE® carrier ampholyte (e.g., PHARMALYTE® 3-10), methyl cellulose, glycine (e.g., about 40 mM), and taurine (e.g., about 50 mM). In some aspects, the icIEF sample matrix comprises about 4% (v:v) PHARMALYTE® 3-10, about 0.35% (w:v) methyl cellulose, and about 50 mM taurine. In some aspects, the icIEF sample matrix comprises about 4% (v:v) PHARMALYTE® 3-10, about 0.35% (w:v) methyl cellulose, about 40 mM glycine and about 50 mM taurine.

The present disclosure also provides methods to increase the accuracy of the quantification of charge variants of an analyte (e.g., a PEGylated protein composition) separated by icIEF comprising using an icIEF sample matrix disclosed herein, e.g., an icIEF sample matrix comprising at least one PHARMALYTE® carrier ampholyte (e.g., PHARMALYTE® 3-10), glycine (e.g., about 40 mM) and taurine (e.g. about 50 mM). Also provided are methods to increase the reproducibility of the separation of charge variants of an analyte (e.g., a PEGylated protein composition) separated by icIEF comprising using an icIEF sample matrix disclosed herein, e.g., an icIEF sample matrix comprising at least one PHARMALYTE® carrier ampholyte (e.g., PHARMALYTE® 3-10), glycine (e.g., about 40 mM) and taurine (e.g., about 50 mM). The present disclosure also provides methods to increase the recovery of charge variants of an analyte (e.g., a PEGylated protein composition) separated by icIEF comprising using an icIEF sample matrix disclosed herein, e.g., an icIEF sample matrix comprising at least one PHARMALYTE® carrier ampholyte (e.g., PHARMALYTE® 3-10), glycine (e.g., about 40 mM) and taurine (e.g., about 50 mM).

Also provided are methods to monitor the thermal stability of an analyte, e.g., a PEGylated protein composition, comprising subjecting the analyte to thermal stress, followed by separation of charge variants of the analyte (e.g., corresponding to fragments or unfolded forms on the PEGylated protein) by icIEF comprising using an icIEF sample matrix disclosed herein, e.g., an icIEF sample matrix comprising at least one PHARMALYTE® carrier ampholyte (e.g., PHARMALYTE® 3-10), glycine (e.g., about 40 mM) and taurine (e.g., about 50 mM). In some aspects, the thermal stability or lack thereof can be measured as a function of the absence, presence, or shape of peak in the electropherograms, or combinations thereof. For example, loss of thermal stability can be visualized as a broadening of peaks, the decrease in the main peak area, an increase in the number or area of peaks corresponding to acidic or basic charge variants, or any combination thereof. In some aspects, the thermal stress comprises an increase in temperature, for example, to about 25° C., about 30° C., about 35° C., about 40° C., about 45° C., or about 50° C. In some aspects, the thermal stress can be applied for about 1 hour, about 2 hours, about 4 hours, about 6 hours, about 12 hours, about 24 hours, about 2 days, about 3 days, about 4 days, about 5 days, about 6 days, about 7 days, about 8 days, about 9 days, or about 10 days. In a particular aspect, the analyte is subjected to a temperature of about 40° C. for about 1 week.

In some aspects, the methods disclosed herein can be used to monitor thermal stability of an analyte, e.g., a PEGylated protein composition, comprising subjecting the analyte to thermal stress, e.g., incubation at 40° C., e.g., for 7 days, for followed by separation of charge variants of the analyte (e.g., corresponding to fragments or unfolded forms on the PEGylated protein) by icIEF comprising using an icIEF sample matrix disclosed herein, e.g., an icIEF sample matrix comprising at least one PHARMALYTE® carrier ampholyte (e.g., PHARMALYTE® 3-10), glycine (e.g., about 40 mM) and taurine (e.g., about 50 mM). In some aspects, the methods disclosed herein can be used to monitor the generation, the presence, or the absence of deamidation products, e.g., asparagine deamidation products of an analyte, e.g., a PEGylated protein composition. In some aspects, the method disclosed herein can be used to quantitate the levels of degradation products, e.g., deamidation products, such as asparagine deamidation products of an analyte, e.g., a PEGylated protein composition. Accordingly, the methods disclosed herein can be used to determine the optimal conditions, e.g., for the production (e.g., to measure yield, stability, purity, or presence/absence of degradation products during the conjugation of PEG to a protein of interest), purification (e.g., to measure yield, stability, purity, or presence/absence of degradation products during the purification of a PEGylated protein), formulation (e.g., to measure stability, or presence/absence of degradation products during or following formulation of a PEGylated protein), storage (e.g., to measure stability, or presence/absence of degradation products during or following storage of a PEGylated protein or a composition comprising such protein such as a crude extract or partially purified PEGylated protein, purified PEGylated protein, or formulated protein), or administration (e.g., to measure stability, or presence/absence of degradation products before or during administration of a PEGylated protein to a subject) of an analyte, e.g., a PEGylated protein composition.

In some aspects, the limit of a quantification (LOQ) of the icIEF methods disclosed herein, i.e., methods comprising the use of an icIEF sample matrix comprising at least one PHARMALYTE® carrier ampholyte (e.g., PHARMALYTE® 3-10), glycine (e.g., about 40 mM) and taurine (e.g., about 50 mM), is approximately 0.028 mg/mL. In some aspects, the limit of a detection (LOD) of the icIEF methods disclosed herein, i.e., methods comprising the use of an icIEF sample matrix comprising at least one PHARMALYTE® carrier ampholyte (e.g., PHARMALYTE® 3-10), glycine (e.g., about 40 mM) and taurine (e.g. about 50 mM), is approximately 0.008 mg/mL.

EXAMPLES

Example 1

Design and Characterization of Improved icIEF Sample Matrices

I. Materials 0.5% methyl cellulose solution, 1% methyl cellulose solution, iCE electrolyte kit, pI marker 4.65, pI marker 6.61, iCE3 Instrument with Alcott 720NV auto-sampler and FC (fluorocarbon) cartridge were purchased from ProteinSimple, the FC cartridge had a 50 mm, 100 μm (internal diameter) fluorocarbon-coated capillary and built-in electrolyte tanks. Urea powder and formamide were purchased from J. T. Baker. PHARMALYTE® 3-10, PHARMALYTE® 4-6.5 and PHARMALYTE® 5-8 are purchased from GE Healthcare. Glycine and taurine were purchased from Sigma. Deionized water was purchased from VWR. All protein samples were cultured, purified, and formulated in low salt buffer and no further desalting step was needed for the icIEF assay.

II. Methods (a) icIEF Sample Matrix Preparation:

The icIEF samples were prepared by combining the reagents to the following final concentrations: 0.35% (w:v, i.e., weight to volume) of methyl cellulose, 4% (v:v; i.e., volume to volume) of PHARMALYTE® 3-10, 40 mM of glycine, 50 mM of taurine, 0.5% (v:v) of pI marker 4.65, 0.5% (v:v) of pI marker 6.61. The analyte (protein) was added to the reagent mixture (sample matrix) to final concentration of 0.5 mg/mL. The prepared samples were gently mixed on a vortex mixer.

The centrifuge was set to a temperate of 10° C. The prepared samples were centrifuged at 10,621 rcf for 3 minutes. After centrifugation, 160 μL of the prepared samples were transferred into a 300 μL vials. The vials were placed in the instrument sample compartment.

(b) iCE3 Instrument Parameters:

The iCE3 instrument was prepared and the FC cartridge was installed according to the instrumentation guideline from the vendor. iCE3 instrument parameters used were the following: pre focus voltage: 1500 V; focus voltage: 3000 V; auto-sampler temperature: 10° C.±1° C.; detection: UV 280 nm; sample injection pressure: 2000 mbar; Pre focus time: 1 minute; focus time: 8 minutes.

(c) Software: iCE CFR Software was Used for Data Acquisition and the Electropherograms Were Imported to Empower Software for Data Analysis.

III. Results and Discussion

The common icIEF matrices were unable to separate acidic and basic variants from the main peak for PEGylated protein A, which resulted in one merged peak in isoelectric focusing (FIG. 1). In icIEF assays, peaks are usually grouped based on their pI values relative to main peak which shows the greatest peak height; peaks prior to the main peak represent the acidic group and peaks after representing the basic group. The main peak and basic peaks co-migrated during isoelectric focusing of PEGylated protein A even if in the presence of the common additive urea. Acidic peaks were also barely separated from the main peak (FIG. 1).

We formamide, another icIEF compatible denaturant (Zhang et al. (2017) Analytical Biochemistry 521:1-7), was used to repeat the experiments, it produced a similar charge profile as when urea was used. Repeat experiments using higher concentrations of urea and formamide worsened the repeatability of the charge profile (data not shown).

Narrower ampholytes, i.e., carrier ampholytes covering a narrow pH range, usually can increase peak resolution (Righetti et al. (2007) Electrophoresis 28:3799-3810) and better separate the charge variants. When narrower ampholytes were used to attempt to separate the different species present in the PEGylated protein A sample, a slightly better separation was observed. Thus, addition of the narrower ampholytes PHARMALYTE® 4-6.5 and PHARMALYTE® 5-8 slightly improved the separation but it was not enough to resolve the broad co-migrating peak (FIG. 2).

Glycine has been reported as a buffer component in sodium dodecyl sulfate capillary electrophoresis (CE-SDS) that can enhances size-based separation of PEGylated proteins (Molek & Zydney (2008) Capillary electrophoresis of PEGylated proteins. In AIChE100-2008 AIChE Annual Meeting, Conference Proceedings (AIChE Annual Meeting, Conference Proceedings)). In separations based on analyte size, glycine can improve the resolution of two already well separated peaks corresponding to size variants: the PEGylated portion vs. the non-PEGylated portion. However, there have been no previous reports regarding the potential separation the co-migrating peaks for charge variants of PEGylated proteins in any isoelectric focusing method.

Accordingly, we employed glycine in imaged capillary isoelectric focusing of PEGylated protein A. Our experimental results showed that glycine enhanced the separation of charge variants of PEGylated protein A (FIG. 3), and that co-migration of the main peak and basic peaks was no longer observed. The mechanism leading to the significantly improved resolution can be due to a reduction in protein adsorption and decrease in excessive Joule heating, similar to those observed during separation size-based capillary electrophoresis of proteins using zwitterions (Bushey & Jorgenson (1989) Journal of Chromatography A 480:301-310; Bushey & Jorgenson (1989) Journal of Chromatography A 480:301-310).

Despite the observed increase in resolution due to the presence of glycine in the sample matrix, the inclusion of glycine in icIEF matrix lead to significant baseline waves in the basic region, which significantly interfered with integration and quantification (FIG. 3). Accordingly, a solution had to be identified to compensate for the negative effect cause by glycine.

Taurine was introduced to further optimize the assay. Taurine, one of the sulfur-containing amino acids which are not incorporated into proteins, can be safely used as an excipient for protein formulations (Arakawa et al. (2007) Amino Acids 33:587-605). The addition of taurine to the sample matrix successfully eliminated the baseline interference in the basic region caused by glycine (FIG. 3), which enabled accurate integration and quantification of basic charge variants.

Like a few previously reported zwitterions, glycine could form a dynamic coating on the capillary surface (Gong & Ho (1997) Electrophoresis 18:732-735), which is the most likely cause of the baseline interference, despite the fact that in the experiments a FC coated capillary was used instead of an uncoated silica capillary. Dynamic coating is possible with use of both uncoated silica capillaries and pre-coated capillaries (Nowak et al. (2017) Anal Bioanal. Chem. 409: 1493-1501). Our indications indicated that it is likely that glycine dynamically coated the FC coated capillary, causing baseline interference, and that taurine, as a zwitterion, competed with glycine, preventing glycine from adhering to the capillary wall and consequently reducing matrix induced baseline interferences caused by the presence of glycine in the sample matrix.

The electropherograms with and without taurine were found to be highly reproducible. A minor basic peak around pI 5.86 most likely merged into an adjacent basic peaks after the addition of taurine (FIG. 3), but the total percentage of basic groups remained very similar. icIEF assay is usually used to monitor total percentage of acidic, main, and basic groups as part of product quality control, so merging of minor basic peaks has little to no impact on quantification of total percentage of basic groups. On the other hand, the significant baseline wave in the absence of taurine added at least a 10% variation to the basic group and the main peak, reducing the assay quantitation and detection limit. Elimination of the baseline wave ensured therefore the accurate quantification of acidic, main, and basic groups.

Glycine and taurine were titrated during method development to find the optimal conditions. An array of glycine concentrations from 0 mM to 200 mM was tested, and 40 mM glycine provided enough resolution to separate the acidic and basic species from the main peak. Additionally, the resulting charge profile was consistent with the protein characterization results. Taurine was titrated from 0 mM to 200 mM, and 50 mM taurine was enough to remove the baseline wave and had minimal impact on the overall charge profile.

Method precision was confirmed by multiple injections and multiple sample preparations of PEGylated protein A using the new glycine-taurine (GLY-T) sample matrix, and charge profiles were consistently reproducible as demonstrated by the e-gram (electropherogram) overlay in FIG. 4.

The precision of the multiple sample preparation was also evaluated by standard deviation of the percentage peak area for the three peak groups, with standard deviation being 0.3%, 0.5% and 0.3% respectively for acidic, main and basic groups (TABLE 1).

TABLE 1

Summary of % peak area for PEGylated protein A in precision study.

| PEGylated Protein A | % Acidic group | % Main peak | % Basic group |
|---|---|---|---|
| Sample preparation 1 | 5.5 | 79.7 | 14.9 |
| Sample preparation 2 | 5.0 | 80.2 | 14.8 |
| Sample preparation 3 | 5.7 | 80.0 | 14.3 |
| Sample preparation 4 | 4.9 | 81.2 | 13.9 |
| Sample preparation 5 | 5.5 | 80.4 | 14.0 |
| Sample preparation 6 | 5.5 | 80.0 | 14.6 |
| Average | 5.4 | 80.2 | 14.4 |
| Standard deviation | 0.3 | 0.5 | 0.3 |
| % RSD | 5.3 | 0.6 | 2.4 |

Linearity and accuracy studies as well as sample stability testing in instrument auto-sampler were performed to ensure the assay quality using the GLY-T sample matrix. Linearity was confirmed by triplicate preparation of PEGylated protein A at 50%, 75%, 100%, 125% and 150% of the nominal concentration. Peak areas were then analyzed as a linear function of the protein concentration. The $R^2$ was greater than 0.98 for all linear curves and the residue plots for all linear curves showed fairly random patterns, indicating a good fit for a linear model.

Accuracy was analyzed by spiking PEGylated protein A in blank matrix (formulation buffer). Spiked samples were prepared in triplicate in five levels over the linear range of 5000 to 150% of the target concentration. The percent recovery was then calculated to evaluate the accuracy of the method. The percent recovery was within 93.2% to 109.9%, 98.0% to 101.9%, and 94.6% to 107.3% respectively for acidic group, main peak and basic group (TABLE 2).

TABLE 2

Summary of peak area and % recovery for PEGylated protein A in accuracy study.

| Protein | Experimental peak area | | | Theoretical peak area | | | % Recovery | | |
|---|---|---|---|---|---|---|---|---|---|
| (mg/mL) | Acidic | Main | Basic | Acidic | Main | Basic | Acidic | Main | Basic |
| 0.250 | 35533 | 396674 | 70991 | 32320 | 392550 | 66139 | 109.9 | 101.1 | 107.3 |
| 0.250 | 30390 | 389622 | 64471 | 32320 | 392550 | 66139 | 94.0 | 99.3 | 97.5 |
| 0.250 | 31056 | 390767 | 65445 | 32320 | 392550 | 66139 | 96.1 | 99.5 | 99.0 |
| 0.375 | 46490 | 574552 | 104152 | 43058 | 565688 | 99793 | 108.0 | 101.6 | 104.4 |
| 0.375 | 42315 | 568787 | 105384 | 43058 | 565688 | 99793 | 98.3 | 100.5 | 105.6 |
| 0.375 | 40567 | 560918 | 100618 | 43058 | 565688 | 99793 | 94.2 | 99.2 | 100.8 |
| 0.500 | 55393 | 728944 | 128493 | 53795 | 738826 | 133447 | 103.0 | 98.7 | 96.3 |
| 0.500 | 55074 | 727896 | 126262 | 53795 | 738826 | 133447 | 102.4 | 98.5 | 94.6 |
| 0.500 | 53259 | 726751 | 129854 | 53795 | 738826 | 133447 | 99.0 | 98.4 | 97.3 |
| 0.625 | 60142 | 916777 | 161886 | 64533 | 911964 | 167101 | 93.2 | 100.5 | 96.9 |
| 0.625 | 64743 | 920429 | 172928 | 64533 | 911964 | 167101 | 100.3 | 100.9 | 103.5 |
| 0.625 | 63357 | 924604 | 176272 | 64533 | 911964 | 167101 | 98.2 | 101.4 | 105.5 |
| 0.750 | 78731 | 1105573 | 206771 | 75271 | 1085102 | 200754 | 104.6 | 101.9 | 103.0 |
| 0.750 | 76470 | 1063470 | 194517 | 75271 | 1085102 | 200754 | 101.6 | 98.0 | 96.9 |
| 0.750 | 73409 | 1076313 | 203962 | 75271 | 1085102 | 200754 | 97.5 | 99.2 | 101.6 |

Linearity and accuracy study results conformed to ICH guidelines (ICH Guideline Q2 (R1) Validation of Analytical Procedures: Text and Methodology, November 2005). The samples were stable for 24 hours in the instrument auto-sampler, and no apparent changes were observed in the e-gram overlay of PEGylated protein A at 0 hour versus 24 hours (FIG. 5).

A stability study was done using temperature stressed PEGylated protein A. PEGylated protein A was treated at a mild heat stress condition (40° C. for 1 week). The heat stressed sample showed a decrease in main peak area and an increase in acidic and basic species using the new GLY-T sample matrix.

Limit of quantification (LOQ) was determined by linear regression using low values of protein concentration from 0.002 mg/mL to 0.032 mg/mL. The experiment was repeated for three times and three injections for each concentration. LOQ was then calculated as 10 times of the standard deviation of the y intercepts over the slope of the linear curve (Shrivastava & Gupta (2011) Chron. Young Sci. 2:21-25).

Limit of detection (LOD) was estimated from LOQ using the equation of LOD=3×LOQ/10 (Shrivastava & Gupta (2011) Chron. Young Sci. 2:21-25). LOQ and LOD of the new icIEF assay were then determined and confirmed to be around 0.028 mg/mL and 0.008 mg/mL.

A robustness study was performed using icIEF and the GLY-T sample matrix. First, we evaluated how auto-sampler temperature and focusing time impacted the robustness of the new assay; charge distribution was about constant within ±1° C. in auto-sampler and ±0.5 min during focusing (TABLE 3).

TABLE 3

Summary of % peak area for PEGylated protein A when changes were applied to the critical parameters, change one variable at a time. ±1° C. changes were applied to the nominal auto sampler temperature (10° C.); ±0.5 minute changes were applied to the nominal focusing time (8 minutes); ±10% changes were applied to the nominal concentration of PHARMALYTE ® (4%), glycine (40 mM), taurine (50 mM) and methyl cellulose (0.35%).

| Method Parameter | % Acidic group | % Main peak | % Basic group |
|---|---|---|---|
| Autosampler (9° C.) | 5.6 | 80.8 | 13.7 |
| Autosampler (10° C.) - nominal | 5.3 | 80.9 | 13.8 |
| Autosampler (11° C.) | 5.5 | 80.9 | 13.6 |
| Focusing time (7.5 min) | 5.6 | 80.4 | 14.0 |
| Focusing time (8 min) - nominal | 5.3 | 80.9 | 13.8 |
| Focusing time (8.5 min) | 5.4 | 80.4 | 14.2 |
| Methyl cellulose (0.39%) | 5.6 | 79.5 | 14.9 |
| Methyl cellulose (0.35%) - nominal | 5.5 | 80.4 | 14.1 |
| Methyl cellulose (0.32%) | 5.3 | 80.8 | 14.0 |
| PHARMALYTE ® (4.4%) | 5.4 | 79.9 | 14.7 |
| PHARMALYTE ® (4.0%) - nominal | 5.5 | 80.4 | 14.1 |
| PHARMALYTE ® (3.6%) | 5.5 | 81.0 | 13.5 |
| Glycine (44 mM) | 5.3 | 80.2 | 14.5 |
| Glycine (40 mM) - nominal | 5.5 | 80.4 | 14.1 |
| Glycine (36 mM) | 5.4 | 80.4 | 14.2 |
| Taurine (55 mM) | 5.6 | 79.6 | 14.8 |
| Taurine (50 mM) - nominal | 5.5 | 80.4 | 14.1 |
| Taurine (45 mM) | 5.5 | 80.2 | 14.3 |

Another robustness study was performed to evaluate all critical reagents, such as methyl cellulose, PHAREMALYTE®, glycine, and taurine. Each reagent was tested at 90% and 110% of the nominal concentration and the resulting % peak area for three peak groups were compared to the ones at nominal condition. Results were very similar within common instrument error range (Salas-Solano et al. (2012) J. Sep. Sci. 35:3124-3129) between the varied and the nominal conditions (TABLE 3).

Finally, combination effects of the critical reagents were assessed to find out the worst-case scenario. The study included three independent variables (concentration of PHARMALYTE®, concentration of glycine, and concentration of taurine) and two levels for each variable (90% and 110% of the nominal concentration for PHARMALYTE®, glycine, and taurine). Eight ($2^3$=8) possible combinations in triplicates and thus twenty-four conditions were evaluated. Results suggested that the 0% peak area changes were very minor even at the worst-case scenarios (TABLE 4).

for all responds reached the nearly perfect score of 0.997 when the three X variables (PHARMALYTE®, glycine, and taurine) were at their nominal concentrations (FIG. 6), which further confirms the nominal concentrations of PHARMALYTE®, glycine and taurine in the GLY-T sample matrix, i.e., 4% PHARMALYTE®, 40 mM glycine, and 50 mM taurine, were optimal.

Charge variants of non-PEGylated protein A can be separated using common icIEF assay conditions. However, the use of icIEF and the sample matrices commonly used (even including additives such as urea or formamide) cannot capture the changes due to PEGylation and later purification processes. An approximately 5.0% increase in main peak area was observed between PEGylated and non-PEGylated protein A. Thus, the newly developed GLY-T sample matrix made it possible to analyze PEGylated protein A and its different charge variants and capture the changes that occurred during the PEGylation and subsequent purification processes.

TABLE 4

Summary of % peak area for PEGylated protein A when changes were applied to the critical parameters, changing multiple variables simultaneously in the study. ±10% changes were applied to the nominal concentration of PHARMALYTE ® (4%), glycine (40 mM), and taurine (50 mM) in the GLY-T sample matrix.

| Combinations[b] | PHARMALYTE ® | Glycine | Taurine | % Acidic group | % Main peak | % Basic group |
|---|---|---|---|---|---|---|
| --- | 3.6% | 36 mM | 45 mM | 5.2 | 80.6 | 14.2 |
| --- | 3.6% | 36 mM | 45 mM | 5.5 | 80.1 | 14.3 |
| --- | 3.6% | 36 mM | 45 mM | 5.5 | 80.9 | 13.7 |
| +-- [a] | 4.4% | 36 mM | 45 mM | 5.2 | 80.9 | 14.0 |
| +-- | 4.4% | 36 mM | 45 mM | 5.9 | 79.7 | 14.3 |
| +-- | 4.4% | 36 mM | 45 mM | 6.0 | 79.6 | 14.4 |
| -+- | 3.6% | 44 mM | 45 mM | 5.3 | 81.1 | 13.6 |
| -+- | 3.6% | 44 mM | 45 mM | 5.5 | 81.7 | 12.9 |
| -+- | 3.6% | 44 mM | 45 mM | 5.5 | 81.2 | 13.3 |
| --+ | 3.6% | 36 mM | 55 mM | 5.4 | 81.1 | 13.5 |
| --+ | 3.6% | 36 mM | 55 mM | 6.2 | 80.2 | 13.6 |
| --+ | 3.6% | 36 mM | 55 mM | 5.2 | 80.2 | 14.5 |
| ++- | 4.4% | 44 mM | 45 mM | 5.5 | 80.5 | 14.0 |
| ++- | 4.4% | 44 mM | 45 mM | 5.1 | 80.4 | 14.4 |
| ++- | 4.4% | 44 mM | 45 mM | 5.3 | 80.6 | 14.1 |
| +-+ | 4.4% | 36 mM | 55 mM | 5.2 | 80.2 | 14.8 |
| +-+ | 4.4% | 36 mM | 55 mM | 5.6 | 79.4 | 14.6 |
| +-+ | 4.4% | 36 mM | 55 mM | 5.5 | 80.0 | 14.5 |
| -++ | 3.6% | 44 mM | 55 mM | 5.4 | 81.4 | 13.2 |
| -++ | 3.6% | 44 mM | 55 mM | 5.3 | 81.3 | 13.4 |
| -++ | 3.6% | 44 mM | 55 mM | 5.3 | 81.2 | 13.5 |
| +++ | 4.4% | 44 mM | 55 mM | 5.4 | 79.1 | 15.4 |
| +++ | 4.4% | 44 mM | 55 mM | 5.4 | 80.1 | 14.5 |
| +++ | 4.4% | 44 mM | 55 mM | 6.1 | 79.2 | 14.8 |
| Average | NA | NA | NA | 5.5 | 80.4 | 14.1 |
| STDEV | NA | NA | NA | 0.3 | 0.7 | 0.6 |
| % RSD | NA | NA | NA | 5.4 | 0.9 | 4.3 |

[a] The symbol of "−" indicates that "−10%" is applied to the nominal concentrations of variables; the symbol of "+" indicates that "+10%" is applied to the nominal concentrations of variables.
[b] The combinations are assigned using following order as shown in the table: PHARMALYTE ®, glycine, taurine; for example, the combination of "−+−" indicates the condition of "−10% of PHARMALYTE ®, +10% of glycine and −10% of taurine".

The results in TABLE 4 were also statistically evaluated using the desirability profiling function in JMP software. The concentrations of PHARMALYTE®, glycine, and taurine were X variables and the resulting percentage peak area for acidic, main and basic group were Y responses. The bottom row of the plot matrix had a plot for each X variable showing its desirability trace, as illustrated in FIG. 6. The overall desirability measure for all three X variables was represented on a scale of 0 to 1 (FIG. 6). The software specified a desirability function for each response and the overall desirability for all responses was defined as the geometric mean of the desirability functions for the individual responses (Derringer & Ronald, S. (1980) Journal of Quality Technology 12:214-219). The overall desirability We further tested several other PEGylated proteins and antibodies using the GLY-T sample matrix. All of them showed better resolution when replacing the common urea containing sample matrix with the GLY-T sample matrix. PEGylated antibody B, as an example, showed much better separation of charge variants using GLY-T matrix (FIG. 7).

In conclusion, the newly developed GLY-T sample matrix enabled icIEF separation of PEGylated proteins, while repeatability, linearity, accuracy, sample stability and method robustness were achieved. As a result, there is no longer a need to implement indirect methods to analyze charge variants of PEGylated proteins, such as analyzing the proteins prior to PEGylation, which cannot capture the changes made during the PEGylation and purification processes. Our observations have shown that the GLY-T icIEF sample matrix provides an excellent solution for the analysis of charge variants of PEGylated proteins in their actual conjugated states and delivers more accurate quantitative and qualitative information about charge variants of PEGylated proteins than the conventional methods currently used.

Example 2

Quantification of PEGylated Protein a Thermal Degradation

PEGylated protein A was subjected to forced degradation via incubation at 40° C. for 7 days. PEGylated protein A and its thermal degradation products were separated using the experimental condicions described above. The sample matrix contained 4% (v:v) PHARMALYTE® 3-10, 0.35% (w:v) methyl cellulose, 40 mM of glycine and 50 mM taurine. PEGylated Protein A samples were diluted in deionized water to 5 mg/mL and then further diluted in sample matrix to 0.5 mg/mL. Samples focused at 1500 V for 1 minute and then at 3000 V for 8 minutes.

Forced degradation of PEGylated Protein A (FIG. 8) resulted in a decrease in the main peak, and increases in the areas of peak more acidic (approx. pH 5.26) and more basic (approx. pH 5.54) than the main peack. This indicates that the improved icIEF sample matrix used in the experiments provides good separation of degradation products in the acidic and basic peaks from the intact PEGylated protein A in the main peak.

The degraded protein in the acidic peak was purified by anion exchange HPLC (AEX HPLC) as described above. The collected acid peak protein was analyzed by LC-MS peptide imaging, and asparagine deamidated PEGylated protein A was identified as the main degradation product in the sample. The purified acidid form was used to spike PEGylated protein A samples and the spiked samples were subjected to ciIEF (FIG. 9). ciIEF detected the increase of asparagine deamidated form in the spiked sample.

Asparagine deamidation is a common cause of acidic peaks in icIEF. Accordingly, the icIEF sample matrix of the present disclosure successfully captured the increase of acidic peak when the asparagine deamidation component was spiked in PEGylated Protein A.

The icIEF matrices of the present disclosure are therefore not only useful to purify PEGylated proteins. In addition, the icIEF matrices was be used to detect degradation, e.g., thermal degradation, and the appearance of degrations products, e.g., asparagine deamidation products. Furthermore, the increase in the area of the peak corresponding to asparagine deamidation products, and the absence of changes in other peaks indicates that the disclosed methods can be used to quantitate PEGylated protein degradation.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

The contents of all cited references (including literature references, patents, patent applications, and websites) that may be cited throughout this application are hereby expressly incorporated by reference in their entirety for any purpose, as are the references cited therein.

What is claimed is:

1. An imaged capillary isoelectric focusing (icIEF) sample matrix comprising (i) glycine at a concentration between about 36 mM and about 44 mM and (ii) taurine at a concentration between about 45 mM and about 55 mM.

2. The icIEF sample matrix of claim 1, wherein the glycine is at a concentration of about 40 mM.

3. The icIEF sample matrix of claim 1, wherein the taurine is at a concentration of about 50 mM.

4. The icIEF sample matrix of claim 1, comprising about 40 mM of glycine and about 50 mM taurine.

5. The icIEF sample matrix of claim 1, further comprising
(i) a carrier ampholyte;
(ii) methyl cellulose; or
(iii) both (i) and (ii).

6. The icIEF sample matrix of claim 5, wherein the carrier ampholyte is at a concentration of about 2% to about 6% (v:v).

7. The icIEF sample matrix of claim 5, wherein the carrier ampholytes is at a concentration of about 3.6% to 4.4% (v:v).

8. The icIEF sample matrix of claim 5, wherein (i) the carrier ampholyte is at a concentration of about 4% (v:v); (ii) the methyl cellulose is at a concentration of about 0.35% (w:v); or (iii) both (i) and (ii).

9. The icIEF sample matrix of claim 5, comprising 4% (v:v) carrier ampholyte, 0.35% (w:v) methyl cellulose, about 40 mM of glycine and about 50 mM taurine.

* * * * *